(12) United States Patent
Gordy et al.

(10) Patent No.: US 7,308,705 B2
(45) Date of Patent: *Dec. 11, 2007

(54) MULTI-PORT NETWORK TAP

(75) Inventors: Stephen C. Gordy, Sunnyvale, CA (US); Arthur Michael Lawson, Morgan Hill, CA (US); Timothy M. Beyers, Los Gatos, CA (US)

(73) Assignee: Finisar Corporation, Sunnyvale, CA (US)

( * ) Notice: Subject to any disclaimer, the term of this patent is extended or adjusted under 35 U.S.C. 154(b) by 670 days.

This patent is subject to a terminal disclaimer.

(21) Appl. No.: 10/742,172

(22) Filed: Dec. 19, 2003

(65) Prior Publication Data

US 2005/0050205 A1 Mar. 3, 2005

Related U.S. Application Data

(60) Provisional application No. 60/498,922, filed on Aug. 29, 2003.

(51) Int. Cl.
*G06F 15/16* (2006.01)

(52) U.S. Cl. .......................... 726/3; 709/224; 709/226; 709/229

(58) Field of Classification Search ................ 709/224, 709/225
See application file for complete search history.

(56) References Cited

U.S. PATENT DOCUMENTS

| | | | | |
|---|---|---|---|---|
| 4,633,202 A * | 12/1986 | Basile et al. | ................ | 333/109 |
| 5,095,381 A * | 3/1992 | Karol | .......................... | 398/75 |
| 5,940,376 A * | 8/1999 | Yanacek et al. | ............ | 370/250 |
| 6,892,237 B1 * | 5/2005 | Gai et al. | ................... | 709/224 |
| 6,898,632 B2 * | 5/2005 | Gordy et al. | ............... | 709/224 |
| 6,925,052 B1 * | 8/2005 | Reynolds et al. | ........... | 370/217 |
| 6,944,656 B2 * | 9/2005 | Evrard et al. | ............... | 709/223 |
| 7,124,438 B2 * | 10/2006 | Judge et al. | .................. | 726/22 |
| 2002/0107952 A1 * | 8/2002 | Mancusi et al. | ............ | 709/223 |
| 2004/0015579 A1 * | 1/2004 | Cooper et al. | .............. | 709/223 |
| 2004/0120259 A1 * | 6/2004 | Jones et al. | ................. | 370/250 |

(Continued)

OTHER PUBLICATIONS

Donnelly, Stephen F., "High Precision Timing in Passive Measurements of Data Networks," Jun. 12, 2002. Chapter 5. Retrieved from http://atm.cs.waikato.ac.nz/pubs/1/pdf/stephen-thesis.pdf. pp. 1-10, 57-96, 183-188.*

(Continued)

*Primary Examiner*—Taghi Arani
(74) *Attorney, Agent, or Firm*—Workman Nydegger

(57) ABSTRACT

The present invention provides for network taps capable of connecting to a plurality of communication cables. The network taps provide one or more levels of multiplexers which allow network data signals from a particular communication cable to be delivered to an attached device in order to monitor the activity of the communication cable. The network taps also include integrated circuitry which control the various functions and components of the network tap. Embodiments of the network taps include ones in which network data signals from each communication cable are communicated to the integrated circuitry to allow the integrated circuitry to monitor across all communication cables; network taps having switches to provide for different port configurations; network taps having switches which allow attached devices to transmit data into the network tap; network taps having ports which allow for cascade configurations; and network taps having integrated circuitry which can communicate with a remote client device to provide additional functionality.

44 Claims, 25 Drawing Sheets

U.S. PATENT DOCUMENTS

2004/0206613 A1* 10/2004 Ward .................. 200/51.09
2004/0250134 A1* 12/2004 Kohler et al. ............ 713/201

OTHER PUBLICATIONS

Garcia, R., "An Optimization Method for Multiplexer Locations," Jul. 12, 1984. Retrieved from http://www.springerlink.com/content/t46x5gg8g63t7qkw/. pp. 111-114.*

U.S. Appl. No. 10/735,417, filed Dec. 12, 2003, Gordy, et al.
U.S. Appl. No. 10/735,801, filed Dec. 13, 2003, Gordy, et al.
U.S. Appl. No. 10/776,579, filed Feb. 11, 2004, Gordy, et al.
U.S. Appl. No. 10/409,006, filed Apr. 7, 2003, Gordy, et al.

* cited by examiner

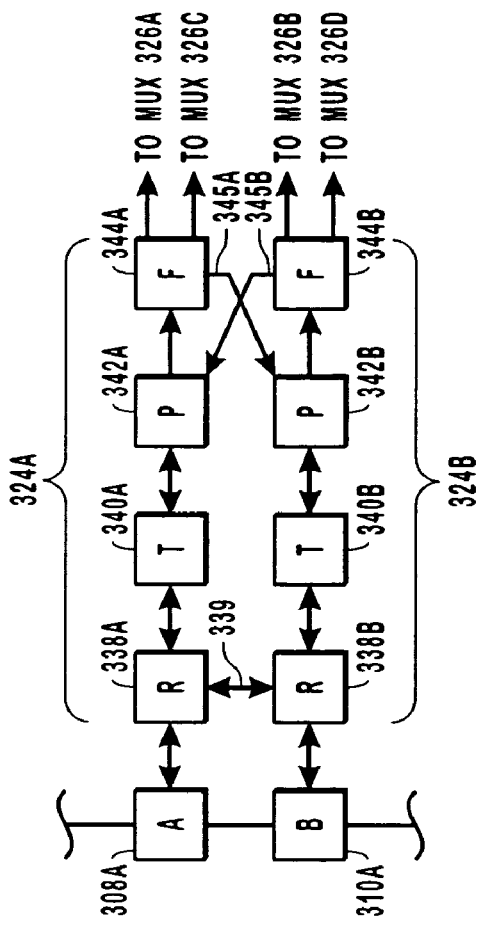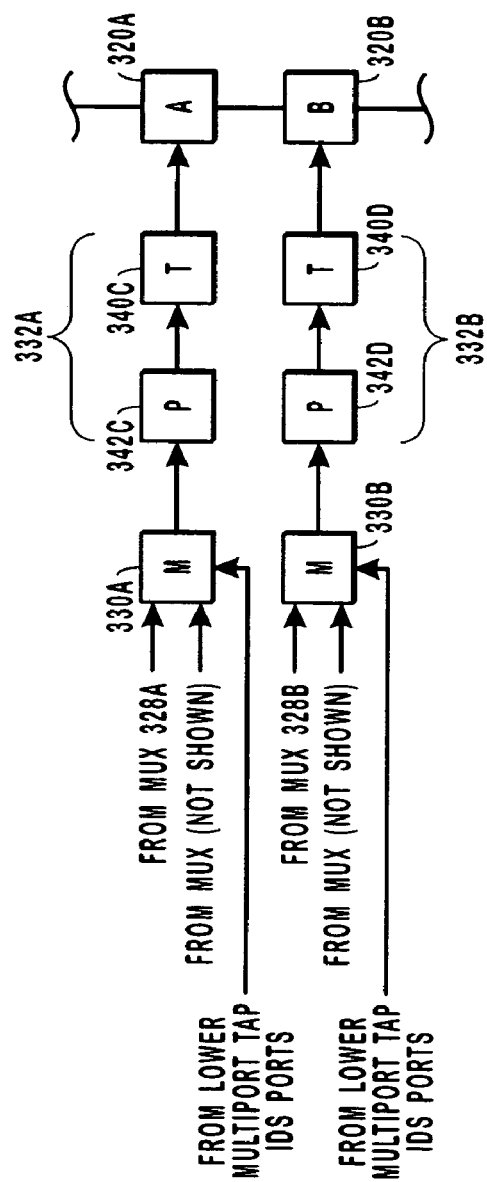
FIG. 4A
FIG. 4B

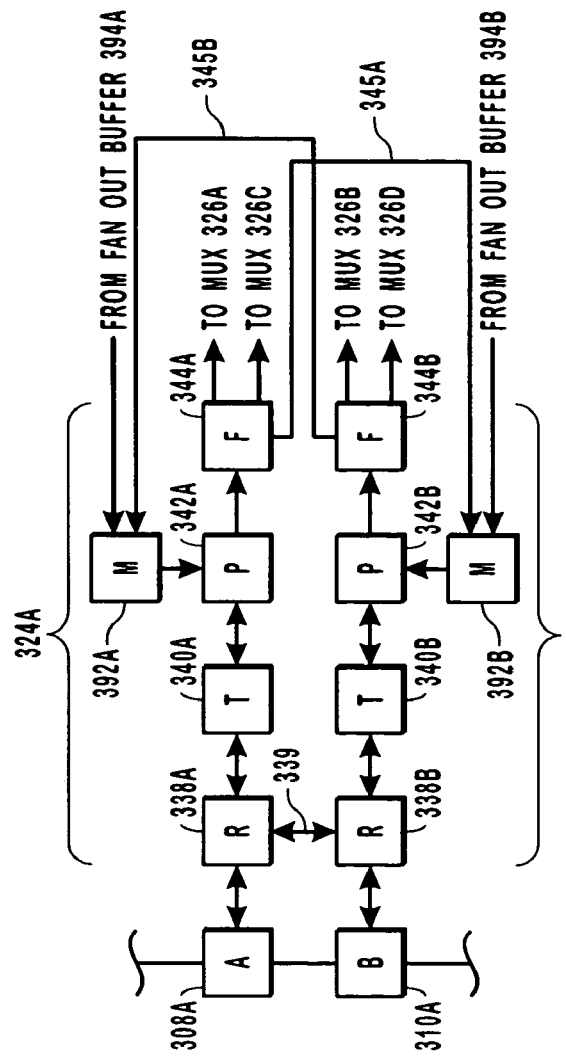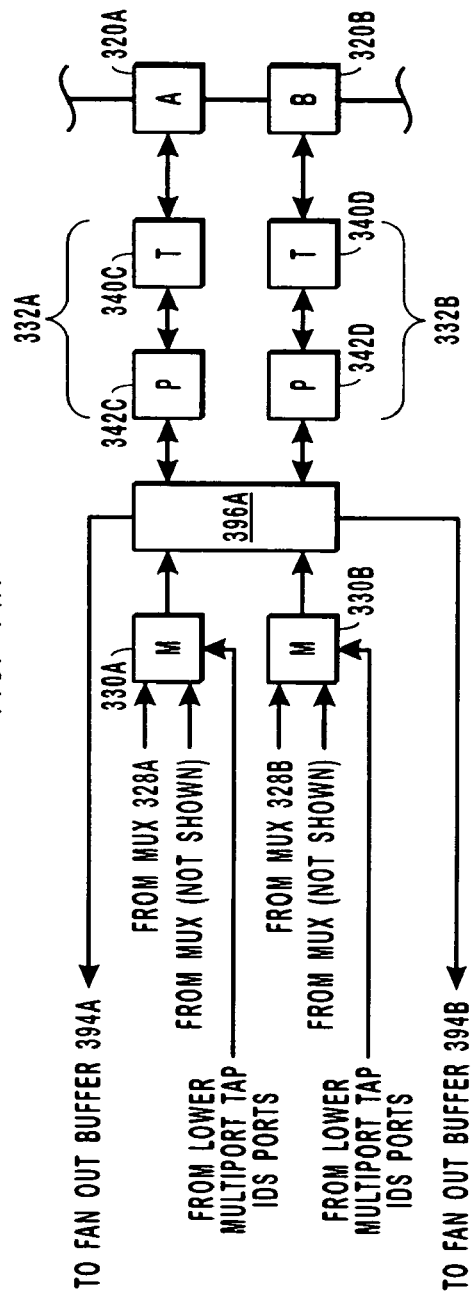
FIG. 14A
FIG. 14B

MULTI-PORT NETWORK TAP

CROSS-REFERENCE TO RELATED APPLICATIONS

This patent application claims priority to and benefit from U.S. Provisional Patent Application No. 60/498,922, filed Aug. 29, 2003 and entitled "Multi-Port Network Tap," which application is incorporated herein by reference in its entirety.

BACKGROUND OF THE INVENTION

1. The Field of the Invention

The present invention relates to network taps for providing access to network data for analysis purposes. In particular, the invention relates to a network tap that allows an attached analyzer device to access and monitor multiple communication links.

2. The Relevant Technology

In recent years, it has been desirable to be able to monitor and analyze the data flow in communication channels between and within networks. Some of these reasons include monitoring the communication channel for certain types of data, identifying and diagnosing network problems, detecting interruptions in the communication channel, detecting degradation in the communication channel, and the like. Thus, network taps, which are systems for tapping into communication lines, have been developed.

In general, a network tap is a device that is positioned in-line with a communication line and enables network analyzers or other attached devices to have access to a copy of the data transmitted over the communication line. A network tap is typically installed by physically disconnecting or breaking a network cable and positioning the tap between the two ends of the network cable. Once the tap is installed, network analyzers or other devices can access the network data without having to manipulate the network cable or altering the topology of the network. Moreover, conventional network taps enable access to the network data without disrupting or modifying the network data or the topology of the network.

Communication system channels have largely been composed of metallic conductors such as copper or other low resistance metals. Systems using such conductors have generally been relatively easy to monitor and evaluate without great disruption or intrusion into the communication channel since current flows throughout the entire conductor and portions of the conductor can be externally "tapped" with another conductor attached to the test equipment that bleeds-off a negligible amount of test current.

Additionally, conductive fibers that transmit light have also been used as communication channel medium and have proven to be advantageous for the transmission of large amounts of information, both in digital and analog form. Fiber conductors, unlike metallic conductors, propagate the information signal in a very longitudinally directional path. Furthermore, the information signal propagates down a very narrow internal portion of the conductor making the non-intrusive external "tapping" of the fiber impractical.

Therefore, in order to monitor a fiber channel, a splitter also known as a coupler, must be placed "in-line" with the fiber channel to reflect a portion of the light from the main conductive fiber channel to another conductive fiber channel that can be coupled to a network analyzer or other test equipment.

FIG. 1 illustrates a system 100 for monitoring a plurality of fiber channels 102-108 connected to a plurality of in-line taps 126-132. The fiber channels 102-108 represent a portion of a communication cable disposed in this example somewhere between the Internet 134 and a local area network (LAN) 136. Each tap 126-132 includes a dedicated coupler 110-116 connecting with a corresponding plurality of dedicated test equipment 118-124. Taps 126-132 allows test equipment 118-124 to monitor and/or analyze the signal in channels 102-108, while an output signal is allowed to continue on to the LAN 136.

While the arrangement of FIG. 1 makes in-line testing possible, the installation of individual taps 126-132 to each individual channel 102-108 has been complex and tedious. Additionally, even when the taps 126-132 are inserted into the various individual fiber channels 102-108, the logistics and expense of connecting dedicated test equipment to each channel soon becomes prohibitively expensive. It would be an advantage to provide a tap which allows for multiple communication channels to be monitored in a cost-effective manner.

Also, even if a single piece of test equipment is reused on multiple channels, the logistics of disconnecting and reconnecting to each of the various couplers becomes expensive, tedious, and, especially when remote monitoring is desired, impractical or impossible to timely access and physically re-couple with each of the channels.

There is a need to provide a non-intrusive solution that efficiently uses network analysis resources while allowing the channel to remain intact without interrupting the flow of traffic on the channel. Furthermore, a need exists for providing convenient selection of channels for monitoring without impacting the flow of communications traffic on the channel under analysis. There further exists a need to efficiently utilize test equipment without requiring deployment of a full suite of test equipment dedicated to each communication channel.

In recent years, various types of attached devices have been developed for connecting to network taps. That is, network taps have been used for reasons other than simply monitoring a communication line. For example, the market for network security systems has also increased and is expected to continue to rise over the next few years. Indeed, security systems are almost a necessity in any enterprise local area network system to prevent unwanted intrusions by unauthorized people. Security systems typically comprise a firewall and/or an intrusion detection system. A firewall generally consists of one or more filters placed in the flow of communication to block the transmission of certain classes of traffic. Alternatively, a firewall may consist of one or more gateways that permit traffic flow into a network system. However, firewalls are sometimes defeated, which can result in unauthorized individuals gaining access to the network.

Intrusion detection systems are network security devices that identify suspicious patterns that may indicate a network or system attack from someone attempting to break into or compromise the network. For example, an intrusion detection system may be implemented to prevent against, among other things, access by hackers or deployment of viruses. In order to detect such intrusions, the intrusion detection system must have access to the data flow in a communication line that is in communication with the firewall. The intrusion detection system analyzes the data for indicia of intrusions.

Firewalls and intrusion detection systems are usually appliances or software applications implemented on servers or client computers in a network. When implemented as an appliance, a firewall and an intrusion detection system are usually separate devices connected to each other and to the network through multiple communication lines and/or switches. However, because conventional network taps permit only uni-directional data flow to connected devices, intrusion detection systems have been configured to communicate with the firewall through an additional external, or out-of-band, communication line and an external switch. This presents additional hardware that needs to be purchased and configured. Furthermore, the external switch is often expensive. It would thus be an advantage to reduce the number of communication lines required to connect a network tap, an intrusion detection system and/or firewall to a network. Furthermore, it would be an advantage to reduce the expense of having an extra switch to allow the intrusion detection system to communicate with the firewall.

Generally, each tap 126-132 requires a pair of ports to connect each test equipment 118-124. Thus, only those test equipment that are connectable by dual cables can be used with the taps in FIG. 1. However, some testing equipment are manufactured to connect to a network tap through a single cable, while others can connect to a network through two cables. For example, an intrusion detection system which has only one port may also require a costly external switch device to combine two ports into one. This can be done with a span port which combines all of the Ethernet traffic onto a single port. Also, there are other analyzers that connect to network taps using one or two cables. However, previous network taps were not flexible enough to accommodate different attached devices requiring different connective configurations. It would thus be an advantage to provide a network tap which allows for multiple types of attached devices to be connected thereto. Additionally, it would thus be advantageous to provide the user with the ability to select between various port configurations or even disable some of the ports.

Furthermore, it would be advantageous to be able to enable or disable a network tap with the ability to send information back through the network tap without disrupting the data flow in the main communication line depending on the type of attached device connected thereto. For some types of attached device, the ability to send device data would be advantageous, while for other types of attached devices, a passive connection is preferred. However, the prior art taps did not provide this type of flexibility. It would thus be an advantage to provide a user with a network tap in which the ability to send information through the tap could be enabled or disabled.

System 100 also illustrates that network taps of the prior art have largely remained passive devices, simply as a means for allowing attached devices to view the network data. However, it would be an advantage to allow attached devices to be able to extract statistics of the network data and use these statistics as a basis for additional functions. It would also be an advantage to be able to upgrade or program a network tap after it has been connected to a network system without having to disconnect the network tap or replace the network tap in order to provide other functionalities.

BRIEF SUMMARY OF THE INVENTION

The present invention relates to network taps capable of being connected to attached devices. As used herein, the term "attached device" includes, but is not limited to, testing equipment, network analyzers, one embodiment including intrusion detection systems, and the like, that can be connected to network taps. The network taps described herein are configured to operate within a network environment. For example, to be placed at a node between the Internet and a local area network.

Network taps are capable of being connected to a plurality of communication cables. As used herein, the term "communication cables" is used interchangeably with the terms "communication channels" and/or "communication links." The communication cables may be, for example, metallic conductor or optical fiber links. Alternatively, the network tap may convert optical fiber signals to electrical signals and vice versa. The network taps enable the attached devices to monitor at least one of the communication cables. In addition, the network taps can be connected in a cascade configuration, allowing an increased number of communication cables to be monitored.

Each communication cable being connected to the network tap carries network data to and/or from the internet and LAN. In order to be connected to the network tap, each communication cable must be severed. As used herein, the term "A segment" refers to one portion of the communication cable, and the term "B segment" refers to another portion of the communication cable. That is, each A segment and B segment carries a network data signal which, when reconnected through the network tap, forms a complete data stream of network data.

The network tap provides a plurality of port sets which allow a plurality of communication cables to be connected thereto. Importantly, the plurality of port sets are configured to be able to connect an A segment and a B segment to the network tap, and thus may be modified depending on whether the communication cables are optical fiber cables or electrical conducting cables.

In addition, the network tap allows a split-off of the network data signal carried in each A segment and B segment of each communication cable to be delivered to one or more attached devices. The present invention provides means for delivering a representation of the network data signal of each A segment and B segment to an ultimate attached device. In one embodiment, multiple levels of multiplexers are used to coordinate the flow of network data signals from the plurality of communication cables. The multiple levels of multiplexers allow the communication cables to be divided into manageable groups.

In one embodiment, each of the ports connecting the A segment and B segment of each communication cable are connected to a coupler. The couplers are configured to duplicate the network data signal so that a portion of the signal is delivered to the attached device, and the other portion of the signal is passed through to the rest of the network. In one embodiment, each coupler comprises a relay, a transformer, a physical layer device, and a fan-out buffer. The fan-out buffer duplicates the network data signal. The relays of paired couplers corresponding to an A segment and a B segment of a communication cable are connected so that a communication link is formed such that if the power fails, data flow is maintained between the A segment and B segment of each communication cable.

The couplers are connected to a first level of multiplexers. The term "first level of multiplexers" may also be used interchangeably with the term primary multiplexers. The first level of multiplexers is divided into a first series, which are connected to the couplers corresponding to the A segment of each communication cable, and a second series, which are connected to the couplers corresponding to the B segment of each communication cable. Furthermore, the first level of multiplexers may be grouped such that the inputs into the first level of multiplexers are reduced. For example, in a network tap having 12 communication cables, the first level of multiplexers may be grouped into groups of 6 multiplexers, groups of 4 multiplexers, groups of 3 multiplexers, and/or groups of 2 multiplexers. The number of groups will depend on design considerations including, the number of inputs desired to be associated with each multiplexer. Each group of multiplexers preferably comprises at least one of a first series or second series of multiplexers. This provides for a more streamlined design on the circuit board of the network tap.

In addition, a second level of multiplexers may be included, connected to the first level of multiplexers. That is, the first level of multiplexers provides multiple inputs and a single output. The single output from the first level of multiplexers is directed to the second level of multiplexers. The second level of multiplexers accepts multiple inputs, such that fewer multiplexers are required in the second level of multiplexers than in the first level of multiplexers. The second level of multiplexers also includes a first series of multiplexers and a second series of multiplexers corresponding to the A segments and B segments of the communication cables. That is, in one embodiment, the output from the first series of multiplexers of the first level of multiplexers, e.g., corresponding to the A segments, are directed to a first series of multiplexers in the second level, which correspond to the A segments of the communication cables. In this manner, the flow of the data signals in the A segments and B segments is transmitted to the attached device in an orderly fashion.

Finally, a third level of multiplexers may also be provided in the network tap. Preferably, the third level of multiplexers provides a one-to-one correspondence with the ports of the attached device. That is, the single output leaving the third level of multiplexers is connected to a coupler which is, in turn, connected to a port for an attached device. In one embodiment, each attached device has a port corresponding to the A segments and one corresponding to the B segments. The third level of multiplexers may also include a first series and second series of multiplexers corresponding to the A segments and B segments of the communication cables. In one embodiment, where there is only a single attached device requiring an A port and a B port, the first series of multiplexers of the third level of multiplexers will only require one multiplexer corresponding to the A port. Similarly, the second series of multiplexers will only require a single multiplexer corresponding to the B port. The coupler between the third level of multiplexers and the ports for the attached devices in one embodiment comprises a physical layer device and a transformer.

In view of the foregoing, it is appreciated that a network data signal from an A segment and/or a B segment of a communication cable connected to the network tap is directed in an orderly fashion toward the ports corresponding to the attached device. In some embodiments, depending on design requirements, the first, second and/or third level of multiplexers may be eliminated.

The network taps of the present invention are also able to be configured in a cascade configuration. That is, the network taps can be connected together so that more communication cables may be monitored by an attached device. The network tap includes a pair of cascade ports which connect to the ports for the attached devices of an adjacent network tap. In addition, the network tap includes serial ports and/or RJ-45 ports which connect to similar ports of an adjacent network tap so that the network taps can communicate with each other.

The network tap also includes integrated circuitry which controls the functions of the network tap including, but not limited to, determining which communication cable is monitored, controlling cascading functions, controlling bypass functions, controlling components of the network tap, and the like. For example, the integrated circuitry controls the multiplexers so that the network data signal from a particular communication cable can be sent to the attached device. The integrated circuitry includes, among other things, a central processing unit ("CPU") module, a field programmable gate array ("FPGA"), and an electrically erasable programmable read-only memory ("EEPROM"). These electrical components communicate with each other to perform various functions of the integrated circuitry.

The CPU module is the main processing center. It includes a CPU, an industry standard architecture ("ISA") bus, a RAM, a peripheral component interface ("PCI") bus, an integrated drive electronics ("IDE") port, an Ethernet chip, a parallel port, and a serial port control. The integrated circuitry also includes a flash drive which is in communication with the CPU module. In some embodiments, the flash drive is incorporated as part of the CPU module.

The network tap includes a control port. The Ethernet chip of the CPU module is in communication with the control port. The client device can be selectively connected to the control port. As such, the client device can input control commands into the CPU module. The client device may also be used to upgrade or program the FPGA. The serial port of the CPU module is in communication with the serial ports of the network tap. This allows communication between the serial ports of one or more network taps to control the cascading functions. The ISA bus, PCI bus, IDE port and parallel ports provide data paths or connections which couple the CPU module to other components of the network tap.

The FPGA includes a control logic module, which includes configuration registers to control components of the network tap (i.e., physical layer devices, relays, switches, and multiplexers). The FPGA is connected to an interface chip. The interface chip is connected to the PCI bus in the CPU module. In this manner, CPU module is able to communicate with the FPGA regarding how to configure components of the network tap. The FPGA is in communication with the controls located on the network tap which allow a user to manually select different functions for the network tap, including, but not limited to, which communication cable to monitor, which communication cable should be tapped, cascading functions and the like.

The network tap may also include a status light-emitting diode ("LED") matrix, which indicates the circuit board power, booting status, operating system status and the like. The network tap may also include an LED matrix which indicates information regarding the status of the network tap, including which port sets have communication cables attached thereto, which communication cables are currently being tapped, cascaded, bypassed, and the like.

The integrated circuitry also includes a programmable integrated circuit ("PIC") which monitors temperature and supply voltages of the integrated circuitry and can also hold non-volatile product data.

The EEPROM is in communication with the CPU module and FPGA. The EEPROM communicates with a complex programmable logic device ("CPLD") to facilitate loading new code into the FPGA.

In another embodiment, a liquid crystal display ("LCD") replaces one or more of the LED matrices. In this embodiment, the integrated circuitry includes a universal asynchronous receiver transmitter ("UART") which interfaces between the LCD and the PCI bus. In another embodiment, a vacuum fluorescent display may be used.

All of the above components for the integrated circuitry are not required. The components depend on particular design requirements.

In one embodiment, multiple network taps can be placed in a cascading configuration. One network tap is designated as the master, and the other network taps are designated as slaves. The network taps are connected by serial ports which allow the integrated circuitry of each network tap to communicate with each other. In addition, the communication cables of each network tap are configured by the cascade ports and ports for the attached devices such that any one of the communication cables from any of the network taps can be transmitted to an attached device.

In order to determine which network tap is designated as the master or slave, the CPU module follows a process logic to determine whether instructions delivered to the Ethernet chip or to the serial port control will take precedence. In general, network tap is constantly polling through the serial ports looking for other network taps. If the CPU module is being polled by another network tap, then it is designated as a slave. If it is not being polled, the CPU module operates as a master. If the CPU module is a master, the network tap determines whether it is receiving any queries through the Ethernet control port. If a client device is trying to communicate with a network tap using the Ethernet control port, the software application on the client device will consistently send queries to the network tap. If queries are being received through the Ethernet control port, then the CPU module does not respond to any instructions coming from the serial in-port. If queries are not being received through an Ethernet control port, then the CPU module responds to instructions from the serial in-port. If the network tap is being polled through a serial in-port, it operates as a slave. That is, the CPU module responds to instructions being recieved through the serial in-port. In this manner, the network taps in a cascade configuration are able to avoid data conflicts.

In one embodiment of the invention, the network tap is configured such that each coupler transmits a representative copy of the network data signal for each A segment and B segment of each communication cable to the integrated circuitry. Specifically, the network data is delivered to the FPGA. The circuitry in the FPGA includes a physical layer device, a buffer, and a packet analysis module. The buffer holds the incoming data packets from each communication cable until they are ready to be analyzed by the packet analysis module. Each packet analysis module performs a statistical analysis on the data packets. The packet analysis is sent to a memory in the FPGA, which may update one or more statistics tables in response to the packet analysis. The FPGA can send any of the statistics as well as any data packets of interest to the CPU module. The control logic in the FPGA contains instructions on how to control components of the network tap. The control logic communicates with the memory and may use any statistical information to determine how to control components of the network tap. Thus, the network taps of the present invention have the ability to monitor and analyze the data flow across all channels of communication at any one time. Whereas, previous network taps were limited to monitoring only one communication cable at a time.

In another embodiment of the invention, one or more switches may be disposed between the third level of multiplexers or the top level of multiplexers and the ports corresponding to the attached devices. The switches have the following functionality. First, the switches can allow the data signals from the multiplexers to pass through to the attached device ports. Second, the switches can combine the data signals from the multiplexers and send the client data to one of the ports. Third, after combining the signal, the switches can mirror the signal so that the client data signal can be sent to both ports. This provides for each port corresponding to an attached device to have the ability to function as a separate and distinct port, having an entire representation of the network data of the communication channel going to a single port. The foregoing functionalities allow the ports corresponding to the attached devices to have different modes or port configurations.

In another embodiment of the invention, the network taps can be configured to allow return device data to be sent to the network tap and delivered to other parts of the network (i.e., the internet or a LAN). Device data may be instructions from the attached devices, messages to be sent to other components of the network, or, in one embodiment, a control signal in the form of one or more kill packets. In this embodiment, the network tap includes fan-out buffers which are disposed between switches discussed above, and the couplers corresponding to the A and B segments. Preferably, one fan-out buffer is provided corresponding to the A segments and a second fan-out buffer is provided corresponding to the B segments. At the fan-out buffers, the return network data signal is duplicated and sent to each coupler corresponding to the A segments or B segments.

In another embodiment, the return device data can be sent to the integrated circuitry before it is transmitted to the fan out buffers in order to allow a remote client device to monitor the device data. The FPGA is configured to monitor and/or analyze the return device data. The FPGA then transmits the return device data to the fan out buffers.

In yet another embodiment, the FPGA can be configured to replace the function of the switches. That is, the FPGA can be configured with multiple buffers to prevent data collisions between the return device data and network data signals being transmitted through the FPGA.

In the embodiment where the network taps are configured to allow return data from the attached devices, the couplers are configured to allow the return data signals to enter the data stream. The couplers to which the communication cables are connected include multiplexers which transmit the return device data to a physical layer device.

In the embodiments where additional switches, fan-out buffers, and multiplexers are provided (i.e., the embodiments allowing various port configurations and return path), the FPGA, or integrated circuitry, is configured to control these additional network components.

In the embodiments where statistical extraction is possible, the FPGA includes a buffer which is disposed between the memory and the Ethernet port of the CPU module.

The integrated circuitry is configured to control the ability of the switches to allow incoming device data from an attached device. In addition, the switches are controlled to allow the various port configurations.

In the embodiment where the network tap is provided with return path functionality, typically, the network tap will be connected to a firewall and the attached device will be an intrusion detection system. When an intrusion is detected by the intrusion detection system, the intrusion detection system will send a kill packet into the network tap which is delivered to a particular communication cable to be delivered to either the firewall and/or the LAN.

It will be appreciated that the return path functionality may be combined with any of the functions of the switch. For example, if the switch is operating in a combined and mirrored mode, which allows a separate attached device to be connected to each port, each attached device is enabled to transmit device data back into the switch, wherein the switch duplicates the device data and sends it to the fan-out buffers to be delivered to one or more of the communication cables. The network taps of the present invention thus provide increased versatility in the manner in which attached devices are connected to the network tap and the manner in which the attached devices are able to communicate with the network tap.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 4A illustrates a block diagram of the details of a portion of the integrated circuitry of the network tap of FIG. 3;

FIG. 4B illustrates a block diagram of the details of another portion of the integrated circuitry of FIG. 3;

FIG. 14A illustrates a block diagram of the details of a portion of the integrated circuitry of the network tap of FIG. 13;

FIG. 14B illustrates a block diagram of the details of another portion of the integrated circuitry of FIG. 13;

DETAILED DESCRIPTION OF THE PREFERRED EMBODIMENTS

Figure 1:
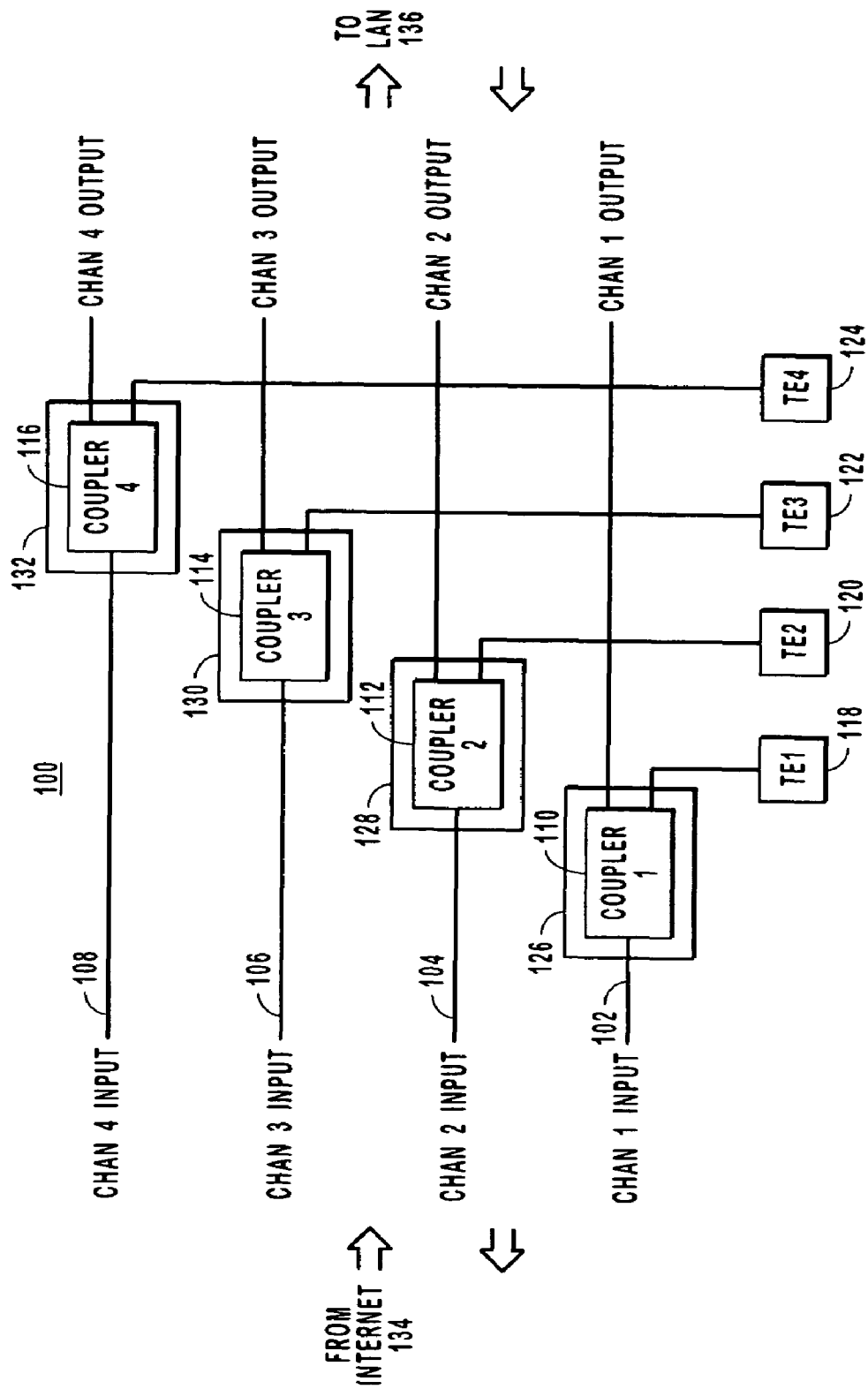
FIG. 1 illustrates monitoring of multiple channels, in accordance with the prior art.
Figure 2:
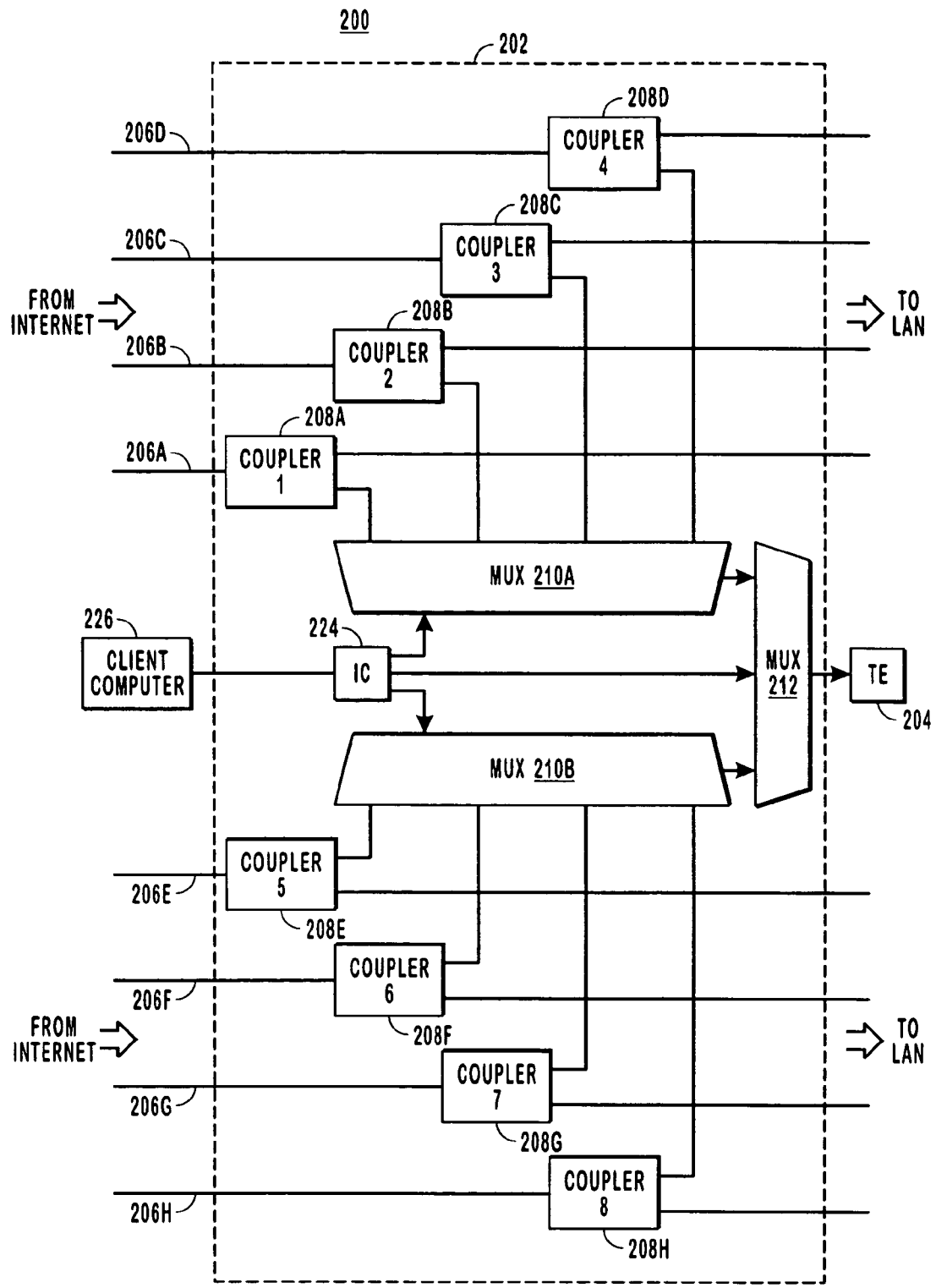
FIG. 2 illustrates a block diagram of a plurality of channels having a switching mechanism capable of selecting one of the channels for routing to a common or shared analyzer.

FIG. 2 provides a block diagram of a network evaluation system 200. Network evaluation system 200 includes a network tap 202 connected to an attached device 204. In one embodiment, attached device 204 may be testing equipment, such as a network analyzer. Network evaluation system 200 is connected to a plurality of communication channels 206A through 206H. Communication channels 206A through 206H may be metallic conductor or optical fiber links. Network tap 202 is configured to have metallic conductor connections or optical fiber connections. Furthermore, network tap 202 may convert from optical fiber signals to electrical signals and vice-versa. Network tap 202 selects a particular channel 206A through 206H for monitoring and/or analyzing from among the plurality of channels. The architecture of FIG. 2 enables a single or shared attached device 204 to monitor a plurality of channels.

The network evaluation system 200 may operate within a network configuration which, by way of example, may include a full-duplex or half-duplex Gigabit Ethernet or Fibre Channel configuration. Those of skill in the art appreciate that Gigabit Ethernet may operate on either single-mode fiber or multi-mode fiber for use in systems which require optical connections.

As illustrated in FIG. 2, network tap 202 is connected to channels 206A through 206H and "taps" each of the channels using couplers 208A through 208H to provide a sample of each of the channels to a switching array, depicted in FIG. 2 as multiplexers 210A and 210B. Multiplexers 210A, 210B select a specific channel from among a possible plurality of channels under direction from an integrated circuit 224 which may be discretely controlled by a client computer 226 from a remote location or manually controlled through local means.

The signal from multiplexers 210A, 210B is sent to multiplexer 212. Multiplexer 212 is, in turn, connected to attached device 204. Integrated circuit 224 controls which of the signals being sent to each multiplexer 210A, 210B and 212 will be used by the attached device 204. Thus, different channels can be monitored by attached device 204 as controlled by integrated circuit 224.

Multiplexers 210A, 210B are also referred to as primary multiplexers. The signals from multiplexers 210A, 210B are sent to a secondary multiplexer 212. Multiple levels of multiplexers are provided in embodiments where it is more feasible to break up the number of communication channels and treat them as symmetrical or mirrored groups. That is, each group of communication channels are treated substantially the same. Channels 206A through 206D constitute one group and channels 206E through 206H constitute a second group. However, it will be appreciated that the signals from each of the channels 206A through 206H may ultimately be delivered to a single multiplexer and then to attached device 204 so that each channel 206A through 206H may be monitored.

Figure 3:
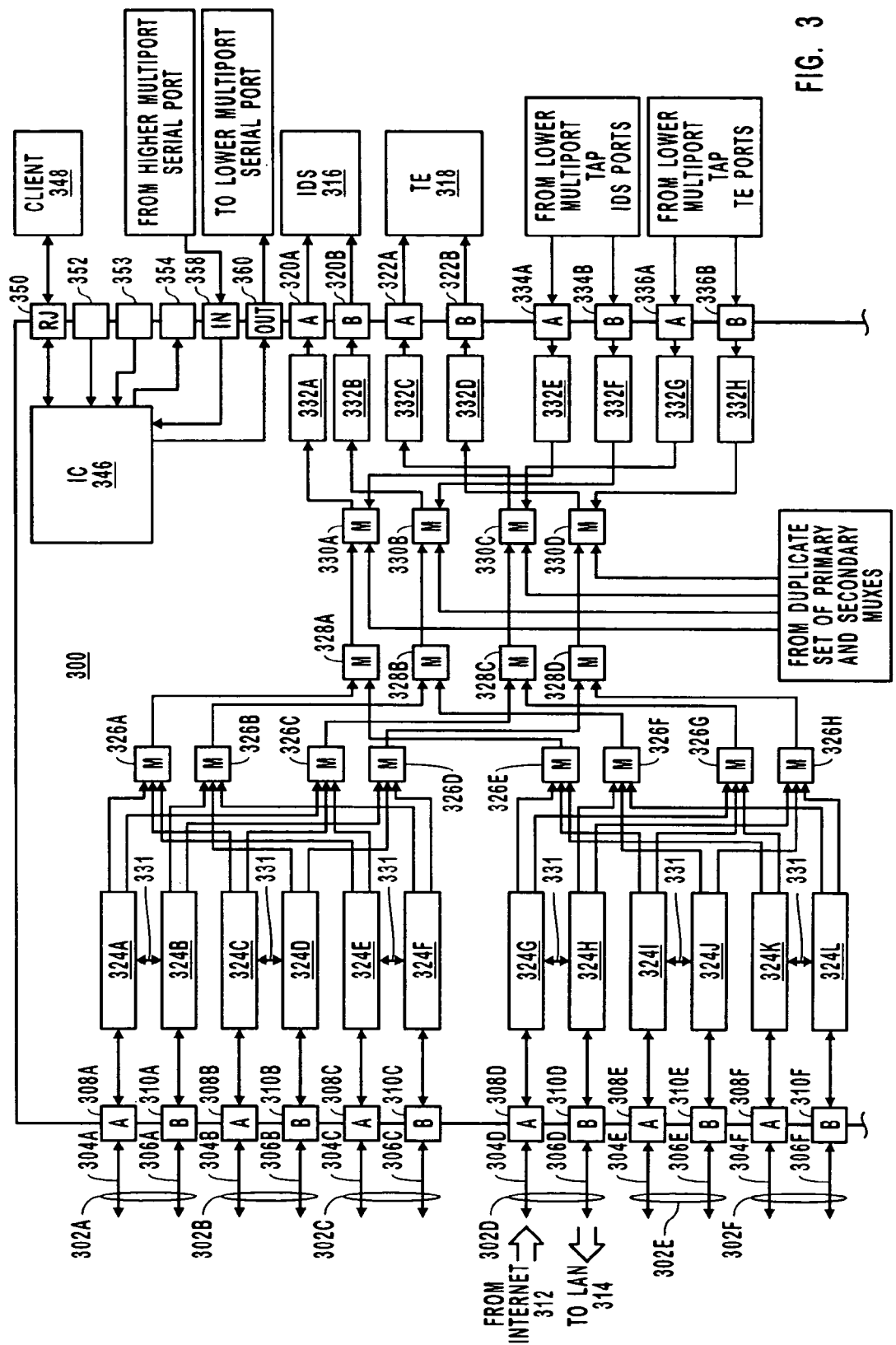
FIG. 3 illustrates a block diagram of the circuitry of a network tap of the present invention, illustrating multiple levels of multiplexers and integrated circuitry to control the multiplexers.

FIG. 3 illustrates an exemplary network tap 300 of the present invention. Network tap 300 is configured to be connected to a plurality of communication cables 302A through 302F. Communication cables 302A through 302F are representative of communication links which are configured to handle bidirectional flow of data. The embodiment illustrated in FIG. 3 is configured to connect to twelve such communication cables 302. For purposes of describing this embodiment, the twelve communication cables 302 are divided into two groups of six. The first group of six communication cables 302 are illustrated in FIG. 3. It will be appreciated that the other six communication cables not shown have a circuit configuration which is very similar to the configuration shown for communication cables 302A through 302F. Thus, for sake of simplicity, only the first six communication cables are illustrated. The present invention is not limited to monitoring twelve communication cables 302, but may be configured to handle more or less communication cables according to design considerations. It will further be appreciated that network tap 300 does not have to operate at its full capacity to provide the functions disclosed herein. For example, a network tap 300 configured to connect to twelve communication cables may be connected to less than twelve communication cables.

In the embodiment of FIG. 3, each communication cable 302 is connected at one end to the Internet 312 and at the other end to a Local Area Network (LAN) 314. Communication cables 302 are configured to handle bidirectional or full duplex flow of communication. Communication cables 302 may also be configured for uni-directional or half duplex data flow. In order to connect to network tap 300, each communication cable 302 must be physically severed. Thus, each communication cable 302 can be embodied in two segments referred herein as an "A" segment and a "B" segment. For example, communication cable 302A is made up of an "A" segment 304A and a "B" segment 306A. Similarly, communication cables 302B through 302F are composed of A and B segments represented by A segments 304B through 304F and B segments 306B through 306F.

As used herein, the term "network data" refers to the data flow carried on communication cables 302. Each A segment and B segment of communication cable 302 thus carries a network data signal. The network data signal may be uni-directional or bi-directional. The configuration of network tap 300 will thus be understood in view of the concept that a "split off" or copy of the network data signal carried in each A segment and B segment is to be sent to various analyzers connected to network tap 300, discussed in more detail below.

A port set is provided to connect each communication cable 302 to network tap 300. Each port set comprises a port 308 to connect to the A segment 304 of the communication cable and a port 310 to connect to the B segment 306 of the communication cable. In further detail, network tap 300 includes a plurality of A ports 308A through 308F which are configured to connect to each A segment 304A through 304F. Similarly, network tap 300 has a plurality of B ports 310A through 310F which are configured to connect to B segments 306A through 306F. In FIG. 3, ports 308A through 308F are indicated with an "A" to represent that they connect to an A segment and ports 310A through 310F are indicated with a "B" to indicate that they connect to a B segment. When A segments 304 and B segments 306 are connected to network tap 300 through ports 308, 310, a complete data circuit is formed, re-establishing the uninterrupted, bi-directional data flow between the Internet 312 and the LAN 314.

In embodiments where communication cables 302 consist of conductive metallic wires, the A ports 308A through 308F and the B ports 310A through 310F may be RJ-45 connections. As is known in the art, RJ-45 connections can be configured for connection to Ethernet cables. In the drawings accompanying this specification, the label "RJ" is used to represent an RJ-45 connection. Because RJ-45 cables support full duplex communication, a pair of RJ-45 ports connects each communication cable 302 to network tap 300.

However, in embodiments where the communication cables 302 are optical fibers, each A segment 304 and B segment 306 may each use two connectors to connect with network tap 300. Thus, in embodiments for optical fiber communication lines, it will be understood that A ports 308 and B ports 310 (or any other port illustrated) may be modified to have a "transmit" port and a "receive" port to allow the communication line to be connected thereto.

Network tap 300 is also configured to connect to various analyzers or attached devices such as, for example, intrusion detection system 316 and the testing equipment 318. As illustrated in FIG. 3, intrusion detection system 316 is connected to ports 320A and 320B. Similarly, testing equipment 318 is connected to ports 322A and 322B. As used herein, the term "attached device" refers to testing equipment 318, intrusion detection system 316, and the like which is configured to be connected to network tap 300 to monitor and/or analyze the data flow on communication cables 302. An analyzer is an example of testing equipment 318.

The A ports 308 and B ports 310 are connected to couplers 324A through 324L. Couplers 324 are configured to transmit the signal from the A ports 308 and B ports 310 and split the signal so that a portion of the signal is delivered to intrusion detection system 316 and testing equipment 318 and the other portion of the signal is passed through to the rest of the network (i.e., the Internet or the LAN). The details of couplers 324A through 324L will be discussed further below with respect to FIG. 4A.

Couplers 324 are connected to a set of primary multiplexers 326A through 326H. Primary multiplexers 326 are connected to a set of secondary multiplexers 328A through 328D. In addition, secondary multiplexers 328 are connected to a set of tertiary multiplexers 330A through 330D.

Multiplexers are circuit devices that have several inputs and one user-selectable output. Theoretically it would be possible to have all of the data streams from all twelve A segments and B segments be connected to a single A multiplexer and B multiplexer. However, as will be appreciated, this would result, in the embodiment of FIG. 3, in twelve input signals into multiplexer 326A and twelve input signals into multiplexer 326B. Thus, in some embodiments, it may be more feasible to have multiple levels of multiplexers to coordinate the flow of network data to the attached devices. Multiple levels of multiplexers facilitate the grouping of communication cables by dividing the number of data streams into manageable groups. The multiplexers are controlled by integrated circuitry 346 so that potentially only one of the data signals from each multiplexer is sent to the next level. The data streams transmitted from the first level of multiplexers may be divided up and regrouped at the next level of multiplexers. This regrouping is carried out to a final multiplexer set which outputs a final A segment output and B segment output. Thus, primary multiplexers 326A through 326H may be referred to as a first level of multiplexers. Secondary multiplexers 328A through 328D may be referred to as a second level of multiplexers; and tertiary multiplexers 330A through 330D constitute a third level of multiplexers.

Within each level of multiplexers are a series of multiplexers which correspond to the A segment of each communication cable (i.e., the "A" series of multiplexers) and a series of multiplexers which correspond to the B segment of each communication cable (i.e., the "B" series of multiplexers). For example, with respect to primary multiplexers 326A through 326H, multiplexers 326A, 326C, 326E and 326G may be referred to as an the series of multiplexers in the first level of multiplexers corresponding to the A segments. Similarly, multiplexers 326B, 326D, 326F and 326H are the series of multiplexers in the first level of multiplexers corresponding to the B segments. The data output from each A and B series multiplexer is sent to another A and B series multiplexer in the next level. The network data from each A segment and B segment of each communication cable is directed to an ultimate A series multiplexer and B series multiplexer in an orderly fashion.

With respect to FIG. 3, the multiple levels of multiplexers will now be described in more detail, first with regard to A segments 304 and then with regard to B segments 306. With regard to A segments 304, couplers 324A, 324C and 324E are connected to A ports 308A through 308C. Couplers 324A, 324C, 324E duplicate the signal transmitted therein and deliver a signal to each of the primary multiplexers 326A and 326C. As discussed further below, the signal sent to primary multiplexers 326A and 326C will ultimately be delivered to testing equipment port 322A and intrusion detection system port 320A. In addition, couplers 324G, 324I and 324K, connected to A ports 308D through 308F, deliver a signal to each of the primary multiplexers 326E and 326G. The signal sent to primary multiplexers 326E and 326G will ultimately be delivered to testing equipment port 322A and intrusion detection system port 320A.

Primary multiplexers 326A, 326C, 326E and 326G are heretofore referred to as primary A multiplexers. The signals in primary A multiplexers 326A and 326E are sent to secondary multiplexer 328A. The signal in primary A multiplexers 326C and 326G are sent to secondary multiplexer 328C. Thus, secondary multiplexers 328A and 328C are heretofore referred to as secondary A multiplexers. Finally, the signal in secondary A multiplexers 328A and 328C are sent to tertiary multiplexers 330A and 330C, respectively. Tertiary multiplexers 330A and 330C are referred to as tertiary A multiplexers. Tertiary A multiplexers 330A and 330C send the signal to A ports 320A and 322A which are connected to intrusion detection system 316 and testing equipment 318, respectively.

FIG. 3 also indicates that signals from a duplicate set of secondary A multiplexers (not shown) are sent to tertiary A multiplexers 330A and 330C. The duplicate set of secondary A multiplexers receive signals from a duplicate set of primary A multiplexers. It will be appreciated that the signal transmitted through the A port corresponding to the six communication cables not shown can be sent to intrusion detection system 316 and/or testing equipment 318 in exactly the same manner described above for A ports 308A through 308F.

Primary, secondary, and tertiary A multiplexers can be controlled so that a particular signal can be accessed by intrusion detection system 316 or testing equipment 318, as will be described in more detail below.

With regard to B segments 306, couplers 324B, 324D and 324F are connected to B ports 310A through 310C. Couplers 324B, 324D, 324F duplicate the signal transmitted therein and deliver a signal to each of the primary multiplexers 326B and 326D. As discussed further below, the signal sent to primary multiplexers 326B and 326D will ultimately be delivered to testing equipment port 322B or intrusion detection system port 320B. In addition, couplers 324H, 324J and 324L are connected to B ports 310D through 310F and deliver a signal to each of the primary multiplexers 326F and 326H. The signal sent to primary multiplexers 326F and 326H will ultimately be delivered to testing equipment port 322B and intrusion detection system 320B.

Primary multiplexers 326B, 326D, 326F and 326H are heretofore referred to as primary B multiplexers. The signals in primary B multiplexers 326B and 326F are sent to secondary multiplexer 328B. The signal in primary B multiplexers 326D and 326H are sent to secondary multiplexer 328D. Thus, secondary multiplexers 328B and 328D are heretofore referred to as secondary B multiplexers. Finally, the signal in secondary B multiplexers 328B and 328D are sent to tertiary multiplexers 330B and 330D, respectively. Tertiary multiplexers 330B and 330D are referred to as tertiary B multiplexers. Tertiary B multiplexers 330B and 330D send the signal to B ports 320B and 322B which are connected to intrusion detection system 316 and testing equipment 318, respectively.

FIG. 3 also indicates that signals from a duplicate set of secondary B multiplexers (not shown) are sent to tertiary B multiplexers 330B and 330D. The duplicate set of secondary B multiplexers receives signals from a duplicate set of primary B multiplexers. It will be appreciated that the B port signals from the six communication cables not shown can be sent to intrusion detection system 316 in exactly the same manner described above for B ports 310A through 310F.

Tertiary A and B multiplexers 330A through 330D are connected to ports 320A, 320B and ports 322A, 322B through couplers 332A through 332D. The details of couplers 332A through 332D will be discussed further below with respect to FIG. 4B.

Primary, secondary, and tertiary B multiplexers can be controlled so that a particular signal flowing therethrough can be accessed by intrusion detection system 316 or testing equipment 318, as will be described in more detail below.

The embodiment of FIG. 3 depicts one way of configuring the grouping for twelve communication cables. Note that FIG. 3 only shows half of the communication cables. In FIG. 3, the first level of multiplexers are grouped into four groups. That is, three communication cables correspond to each group of multiplexers. At the second level of multiplexers, the multiplexers are grouped into two groups with six communication cables corresponding to each group of secondary multiplexers. Finally, the third level of multiplexers corresponds to all of the communication cables.

It will be appreciated that multiplexers may be grouped in different configurations. For example, the first level of multiplexers may be grouped into three groups such that four communication cables correspond to each group. The second level of multiplexers corresponds to all of the communication cables. This could also be viewed as eliminating the second level of multiplexers.

In yet another embodiment, the first level of multiplexers may be grouped into two groups such that six communication cables correspond to each group. The second level corresponds to all of the communication cables. It will be appreciated that as the groups of multiplexers decreases, the number of inputs into each multiplexer increases.

Referring back to FIG. 3, each pair of couplers 324 corresponding to a communication cable 302 are connected by a communication line 331 that represents two things. First, communication line 331 represents that a link is formed between the pair of couplers 324 such that if power is lost, the data flow between the A segment 304 and the B segment 306 is maintained. Second, communication line 331 represents that a copy of the data from each A segment 304 and B segment 306 is sent to the opposing coupler 324 to form a complete data link between the Internet 312 and the LAN 314.

With reference to FIG. 4A, couplers 324 are described in further detail. Specifically, FIG. 4A depicts the connection between A port 308A and B port 310A and couplers 324A and 324B. Coupler 324A includes a relay 338A, a transformer 340A, a physical layer device 342A and a fan out buffer 344A. Each of these components are connected in series such that a communication signal from port 308A is delivered from port 308A to fan out buffer 344A. Similarly, coupler 324B includes a relay 338B, a transformer 340B, a physical layer device 342B and a fan out buffer 344B. It will be appreciated that the circuitry between ports 308, 310 and couplers 324 may incorporate other circuitry configurations as understood by those of the art.

Relays 338A and 338B are connected by a communication line 339. As such, a complete data link is formed between relays 338A and 330B in the event that there is a loss of power in network tap 300.

Transformers 340A, 340B provide the isolation and common mode filtering required to support category 5 UTP cables for use in Ethernet 10/100/1000Base-T duplex applications. Physical layer devices 342A, 342B convert the electrical signals into a desired format that is compatible with the signal's intended destination. In one embodiment, physical layer devices may be a transceiver such as the Alaska® Quad Gigabit Ethernet Transceiver manufactured by Marvell® located in Sunnyvale, Calif.

At fan out buffers 344A, the signal from A port 308A is duplicated such that a first copy of the signal is sent to primary A multiplexer 326A, a second copy of the signal is sent to primary A multiplexer 326C, and a third copy of the signal is sent to physical layer device 342B. Specifically, fan out buffer 344A is connected to physical layer device 342B through communication line 345A. Similarly, at fan out buffer 344B, the signal from B port 310A is duplicated such that a first copy of the signal is sent to primary B multiplexer 326B, a second copy of the signal is sent to primary B multiplexer 326D, and a third copy of the signal is sent to physical layer device 342A. Fan out buffer 344B is connected to physical layer device 342A through communication line 345B.

Thus, communication line 345A, 345B form a complete data path between the Internet and the LAN. That is, data flowing from the Internet flows through A segment 304A to port 308A, relay 338A, transformer 340A, physical layer device 342A, fan out buffer 344A to physical layer device 342B, transformer 340B, relay 338B to port 310A to B segment 306A to the LAN. An opposite data path can be formed from B segment 306A to port 310A, relay 338B, transformer 340B, physical layer device 342B, fan out buffer 344B to physical layer device 342A, transformer 340A, relay 338A to port 308A to A segment 304A to the Internet.

With reference to FIG. 4B, the circuitry components 332A through 332D between tertiary multiplexers 330 and ports 320, 322 is illustrated in further detail. Specifically, FIG. 4B depicts circuitry components 332A and 332B between tertiary A multiplexer 330A, tertiary B multiplexer 330B and ports 320A, 320B. Multiplexer 330A is connected to a physical layer device 342C which is, in turn, connected to a transformer 340C. Transformer 340C is connected to port 320A. Similarly, multiplexer 330B is connected to a physical layer device 342D and, in turn, to a transformer 340D. Transformer 340D is, in turn, connected to port 320B. Appreciably, other circuitry configurations may be used between tertiary multiplexers 330 and ports 320, 322 depending on particular design requirements.

The network taps of the present invention are also able to be configured in a "cascade" configuration. That is, the network taps can be linked together so that more communication cables may be monitored by intrusion detection system 316 and/or testing equipment 318. Referring back to FIG. 3, network tap 300 includes a first pair of ports 334A, 334B which can be connected to ports 320A, 320B of a lower network tap. As used herein, the term "lower" refers to the configuration of FIG. 8, which will be described in more detail below. However, the term "lower" does not necessarily necessitate a certain directional position with respect to network tap 300. Network tap 300 also includes a second pair of ports 336A, 336B which can be connected to the ports 322A, 322B of a lower network tap. Thus, ports 334A and 336A are "A ports" or, in other words, transmit signals from an A segment of a communication cable, and ports 334B and 336B are "B ports."

The signal from A ports 334A, 336A is delivered to tertiary A multiplexers 330A, 330C via couplers 332E, 332G. In addition, the signal from B ports 334B, 336B is delivered to tertiary A multiplexers 330B, 330D through couplers 332F, 332H. As such, it will be appreciated that multiplexers 330A through 330D can be controlled to deliver the signals from a lower network tap to intrusion detection system 316 and/or testing equipment 318. In addition, ports 320A, 320B and ports 322A, 322B of network tap 300 may be connected to ports 334A, 334B and 336A, 336B of a "higher" network tap. As such, a "cascading" configuration is formed. A cascading tap configuration allows more than 12 communication lines to be monitored at any one time. Thus, for example, if a higher network tap and a lower network tap are connected to network tap 300 at the same time, each network tap having twelve communication cables connected thereto, potentially thirty-six (36) communication cables could be monitored by an intrusion detection system 316 and/or testing equipment 318 connected to the highest network tap. The cascade configuration will be described below in further detail with respect to FIG. 8.

Figure 5A:
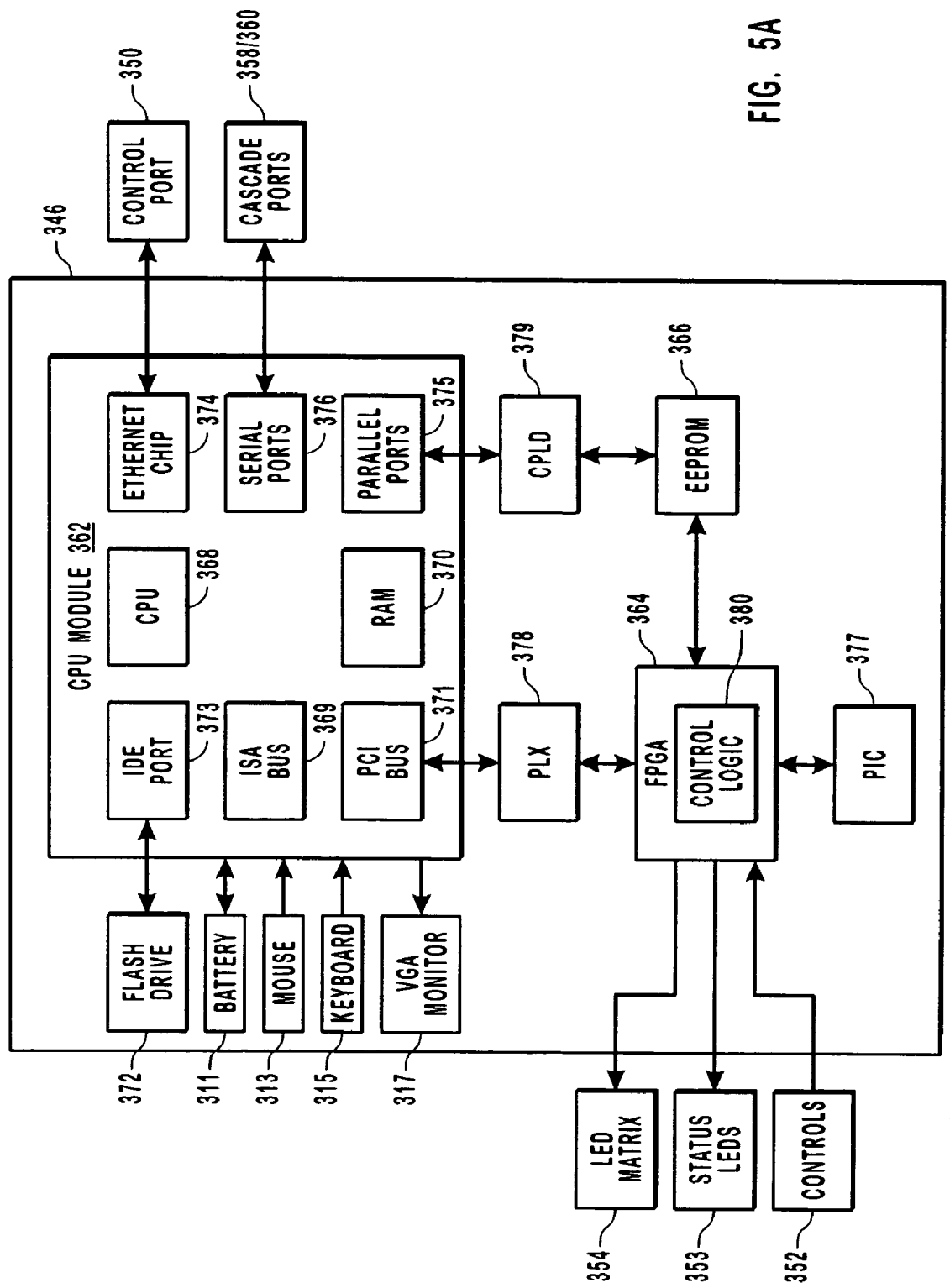

FIG. 5A is one example of integrated circuit 346 in more detail. Integrated circuit 346 includes a central processing unit (CPU) module 362, a Field Programmable Gate Array (FPGA) 364, and Electrically Erasable Programmable Read-Only Memory (EEPROM) 366. CPU module 362, FPGA 364 and EEPROM 366 communicate between each other.

Figure 5B:
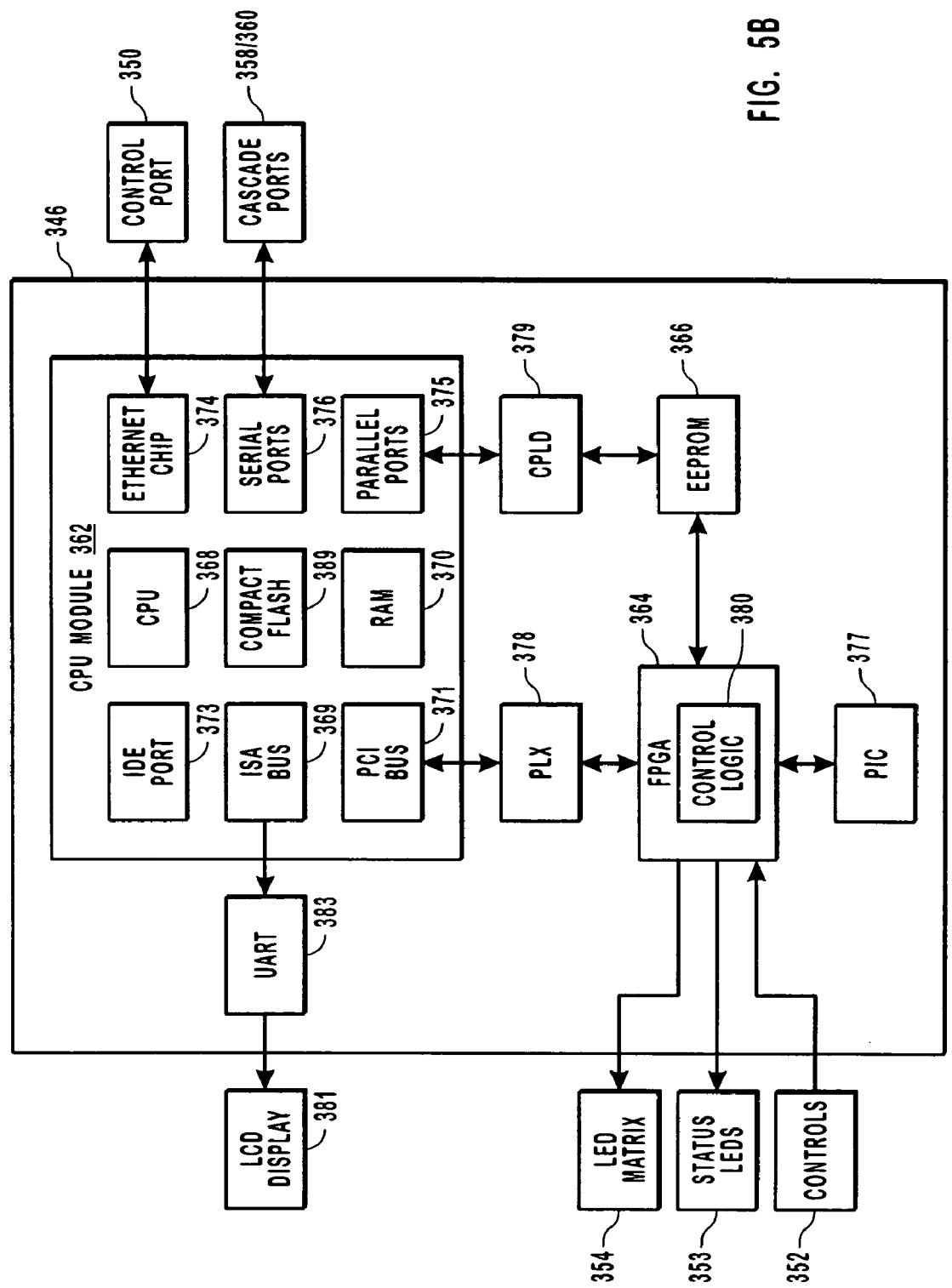

CPU module 362 is the main processing center. As such, CPU module 362 acts as a central processing hub between information from outside of network tap 300 and information from inside network tap 300. CPU module 362 includes a CPU 368, Industry Standard Architecture (ISA) bus 369, a RAM 370, a Peripheral Component Interface (PCI) bus 371, an integrated drive electronics (IDE) port 373, an Ethernet chip 374, a parallel port 375, and a serial port control 376. As shown in FIG. 5A, integrated circuitry 346 also includes a flash drive 372 which is in communication with CPU module 362 through IDE port 373. Alternatively, as depicted in FIG. 5B, integrated circuitry 346 may include a compact flash card 389 instead of an external flash drive. FIG. 5A also shows that integrated circuitry 346 has a battery 311. Integrated circuitry 346 may also be configured to communicate with a mouse 313, keyboard 315 and/or VGA monitor 317. Mouse 313, keyboard 315, and VGA monitor 317 allow a user to command and control the network tap independent of other management tools such as the client device 348, which is discussed below. Other embodiments not showing these components may be duly modified to incorporate the same.

Ethernet chip 374 is in communication with a control port 350. A client device 348 can be selectively connected to Ethernet control port 350. In one embodiment, control port 350 allows serial communication between a client device (not shown) and Ethernet chip 374. Ethernet chip 374 receives control commands from client device 348 regarding such control functions as which communication cable 302 to monitor, which communication cable 302 should be tapped to intrusion detection system 316 and/or testing equipment 318, cascading functions, whether intrusion detection system 316 and/or testing equipment 318 are allowed to send data back into network tap 300, selecting various port configurations, and the like. Client device 348 may also instruct CPU 368 how to control components of network tap 300, such as which instructions are passed on to FPGA 364. Client device 348 may also be used to upgrade or program FPGA 364. Client device 348 may be any hardware device having an application thereon that allows a user to program FPGA 364. For example, client device 348 may be a personal computer, a laptop computer, a hand-held personal data assistant (PDA), a cellular telephone, a notepad, a dedicated programming device designed specifically for programming FPGA 364, and the like.

Furthermore, the connection between integrated circuitry 346 and client device 348 allows exchange of information therebetween. This allows FPGA 364 to receive and transmit communication through client device 348. Client device 348 comprises client software which allows a user to program FPGA 364 externally. FPGA 364 may thus be programmed to control physical layer devices, relays, or other components of network tap 300. In addition, FPGA 364 may be programmed to add or to alter functionality of the FPGA. For example, in one embodiment, FPGA 364 can be programmed to collect certain statistical information on the data flow in network tap 300 and to transmit those statistics to client device 348. As such, it will be appreciated that FPGA 364 is provided with additional functionality. Port 350 may thus be properly termed a "management port."

The client device 348 can be either local with respect to network tap 300 or can be remote, with communication being established using the Internet or a private network. Client device 348 allows FPGA 364 to be reprogrammed at the location where network tap 300 is connected to the network instead of having to disconnect network tap 300 from the network to reprogram or replace the network tap.

Those skilled in the art recognize that client device 348 gives network tap 300 an IP address for purposes of network configurations. Where prior art taps were not detectable by network monitoring devices, some embodiments of network taps of the present invention are recognizable.

In addition, serial port 376 allows CPU module 362 to communicate with a pair of serial ports 358, 360. In one embodiment, serial port 358 is a serial IN port and serial port 360 is a serial OUT port. In one embodiment, serial ports 358, 360 are a pair of Universal Serial Bus (USB) ports. Serial ports 358, 360 can be connected to corresponding serial ports on other network taps, thus placing the network taps in cascading configuration, which will be described in further detail below. Thus, ports 358, 360 may also be referred to as "cascade ports" or "cascade network ports."

The functions of ISA bus 369, PCI bus 371, IDE port 373, and parallel ports 375 are well known in the art. Generally, these components provide data paths or connections which couple CPU module 362 to other components of network tap 300.

FPGA 364 includes a control logic 380 which includes configuration registers to control components of network tap 300 (i.e., physical layer devices, relays, switches and multiplexers). FPGA 364 is connected to an interface chip 378. In one embodiment, interface chip 378 is a PLX® interface chip. Interface chip 378 is connected to PCI bus 371 in CPU module 362. This allows FPGA to communicate with CPU module 362. Through PCI bus 371, FPGA 364 receives commands from CPU module 362 regarding how to configure components of network tap 300 including, but not limited to, physical layer devices, relays, multiplexers, switches, and the like.

FPGA 364 is in communication with one or more controls or buttons 352 which allow a user to manually select different functions for network tap 300. These functions include, but are not limited to, which communication cable 302 to monitor, which communication cable 302 should be tapped to intrusion detection system 316 and/or testing equipment 318, cascading functions, whether intrusion detection system 316 and/or testing equipment 318 are allowed to send data back into network tap 300, selecting various port configurations, and the like.

FPGA 364 is connected to a status light emitting diode (LED) matrix 353. Status LEDs 353 indicate the circuit board power, booting status, operating system status, and the like.

FPGA 364 is also connected to a light emitting diode (LED) matrix 354 which indicates to users information regarding the status of network tap 300. For example, LED matrix 354 may indicate which port sets have a communication cable attached thereto, which of these communication cables are being tapped, cascaded, bypassed, and the like.

Integrated circuitry 346 also comprises a programmable integrated chip (PIC) 377 which monitors temperature and supply voltages of integrated circuitry 346. PIC 377 also holds product data such as product information and serial numbers. PIC 377 communicates this information with CPU module 362 to alert CPU module 362 if the temperature or voltage exceeds expected levels.

EEPROM 366 is in communication with CPU module 362 and FPGA 364. EEPROM 366 communicates with a Complex Programmable Logic Device (CPLD) 379 to facilitate loading new code into FPGA 364. CPU module 362 writes the new code to CPLD 379 which then loads new code into EEPROM 366. EEPROM 366 then loads the new FPGA code into FPGA 364.

FIG. 5B illustrates another embodiment of network tap 300 and integrated circuitry 346. FIG. 5B is substantially similar to FIG. 5A. As such, like elements are referred to with like reference numerals. In this embodiment, a Liquid Crystal Display (LCD) 381 is used to provide the status of the network tap. Integrated circuitry 346 comprises a Universal Asynchronous Receiver/Transmitter (UART) 383 which interfaces between ISA bus 369 and LCD 381. LCD 381 is able to perform the same functions as LED matrix 354, that is, display which ports are tapped, cascaded, bypassed, and the like. LCD 381 can also display IP addresses and other configuration details of network tap 300. In another embodiment, a vacuum fluorescent display may be used to perform the functions of the status LEDs 353, LED matrix 354, and/or LCD 381.

Figure 5C:
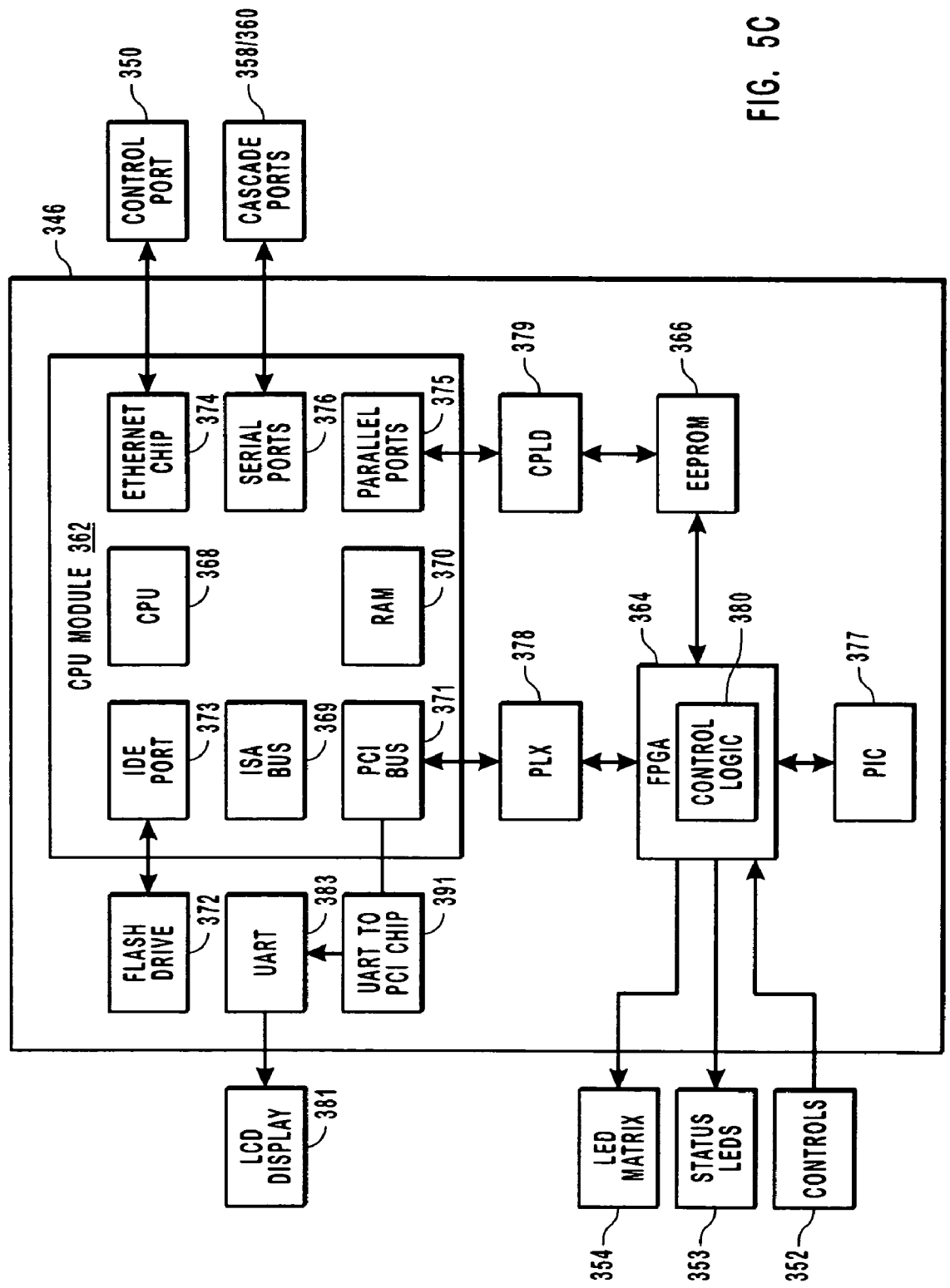

FIG. 5C depicts another embodiment of integrated circuitry 346. In this embodiment, UART 383 is controlled by the PCI bus 371 through interface chip 391 instead of ISA bus 369. Oxford Semiconductor makes a suitable interface chip 391, identified as part number OXCB950.

Figure 6A:
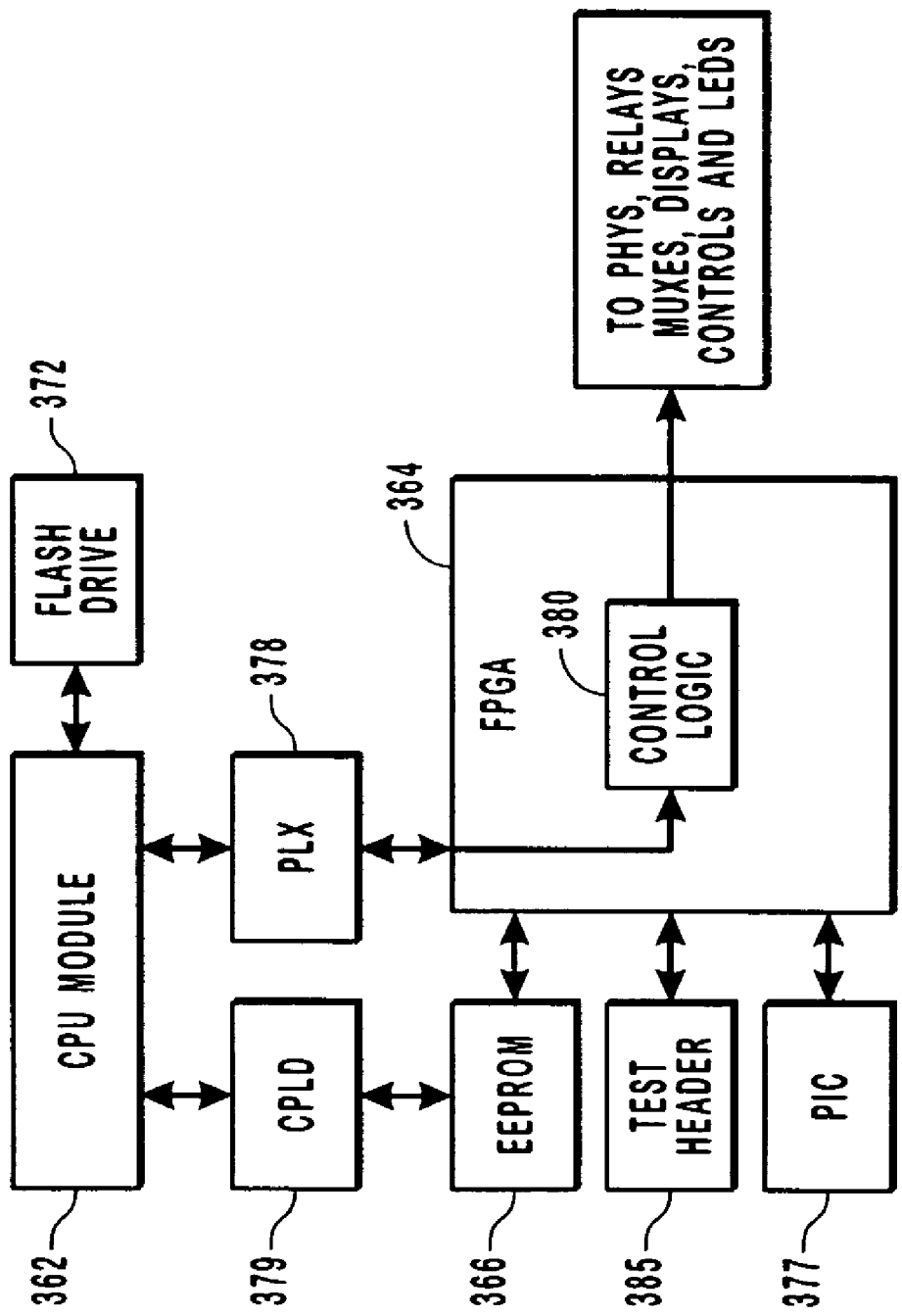
FIG. 6A illustrates a block diagram of one embodiment of the FPGA of FIG. 3.

FIG. 6A depicts an embodiment of a configuration for FPGA 364 for network tap 300. FPGA 364 includes a control logic which instructs FPGA 364 how to control components of network tap 300 such as, but not limited to, physical layer devices, relays, multiplexers, displays, controls and LEDs. FPGA 364 may also be implemented in conjunction with a test header 385.

Figure 6B:
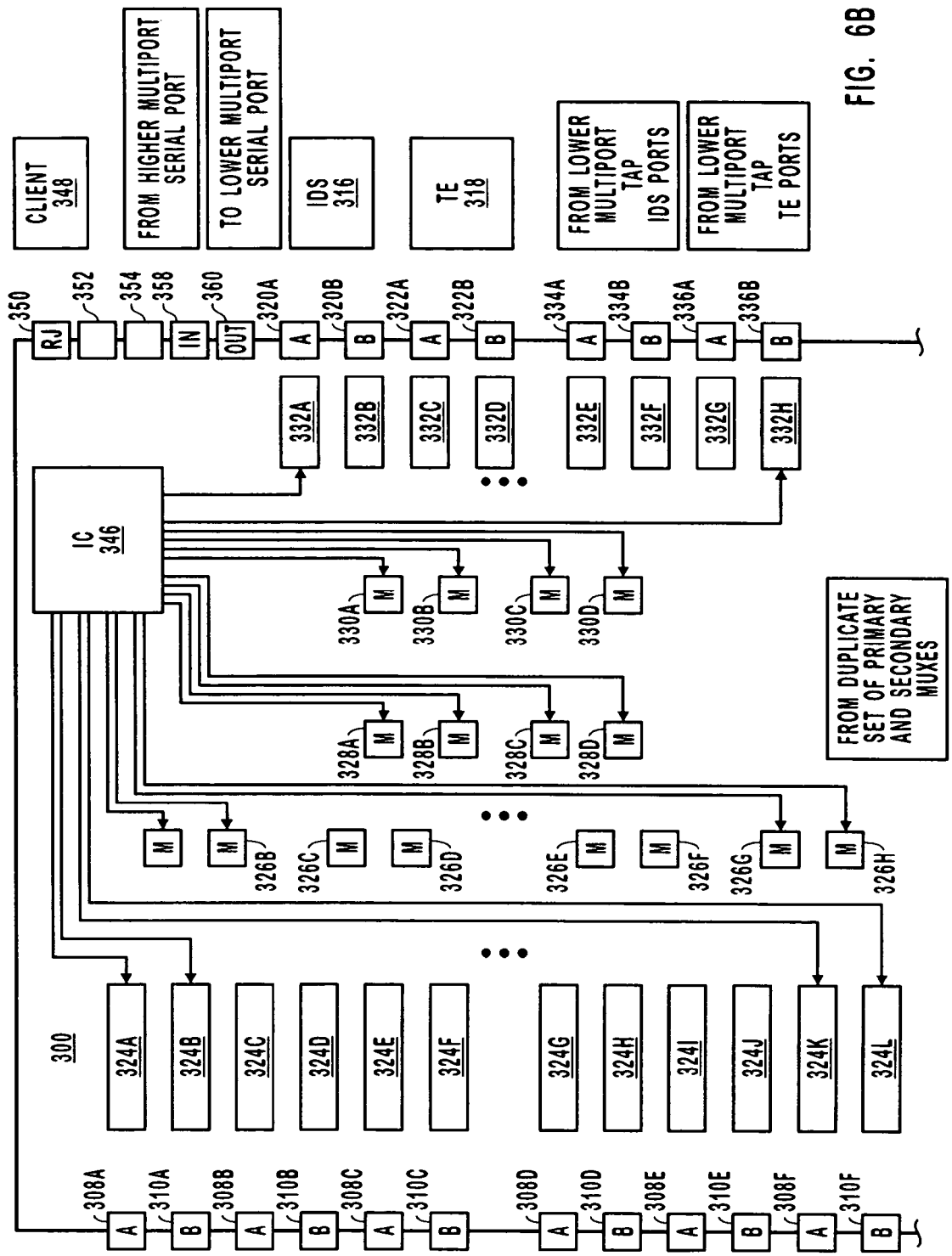
FIG. 6B illustrates a block diagram of the network tap of FIG. 3, illustrating how the integrated circuitry (e.g., FPGA) controls components of the network tap.

FIG. 6B illustrates one embodiment showing how FPGA is configured to control various components of network tap 300. As discussed above, FPGA 364 also contains integrated circuitry which allows FPGA 364 to be programmable, even after network tap 300 is inserted into the communication link.

In operation, network data flows between the Internet and the LAN as described above. If there is a loss of power to network tap 300, the data is routed through the relays for each communication cable 302 so that data is not lost. At couplers 324A through 324L, the signal on which the data packets are encoded is split or duplicated so that a representation of the data flowing between the Internet and the LAN can be sent to a plurality of multiplexers 326, 328, 330. Each multiplexer contains one input which is grounded so that when the multiplexers is not in use, the output is silent such that it does not create unnecessary noise. Finally, data packets are ultimately sent to intrusion detection system 316 and testing equipment 318.

Integrated circuit 346 controls primary, secondary and tertiary multiplexers 326, 328 and 330 so that a particular A signal and B signal from any one of the communication cables 302 connected to network tap 300 can be sent to intrusion detection system 316 and/or testing equipment 318. That is, port 320A which is connected to intrusion detection system 316 can have access to the A segment 304 of any of the communication cables 302 connected to network tap 300. In addition, port 320B, which is connected to intrusion detection system 316, can access the B segment 306 of any of the communication cables 302 connected to network tap 300. Ports 322A, 322B are similarly configured.

Figure 7:
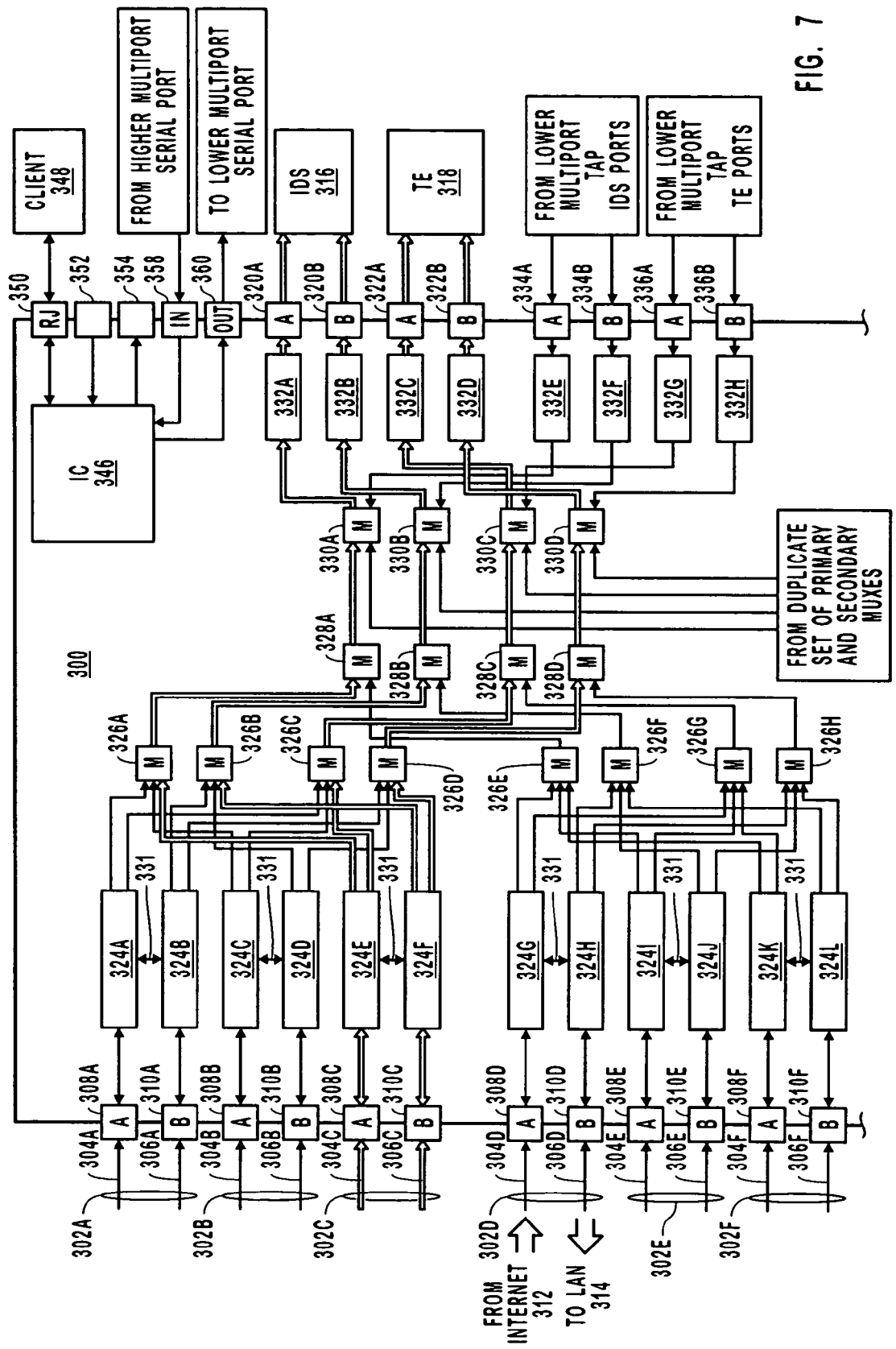
FIG. 7 illustrates a block diagram of the network tap of FIG. 3, illustrating how the primary, secondary and tertiary multiplexers can be controlled to allow a signal from any one of the communication channels to be monitored by the testing equipment and/or intrusion detection system.

FIG. 7 depicts one embodiment wherein network data from communication cable 302C is sent to intrusion detection system 316 and testing equipment 318. As illustrated in FIG. 7, primary multiplexers 326A and 326C are controlled to only use the signals coming from coupler 324E and ignore the transmissions coming from couplers 324A and 324C. Thus, a duplicate signal containing a representation of the network data signal on A segment 304C is sent from coupler 324E to each of primary multiplexer 326A and 326C. Similarly, primary multiplexers 326B and 326D are controlled only use the signals coming from coupler 324F and to ignore the transmission coming from coupler 324B and coupler 324D. A duplicate signal containing a representation of the network data signal carried on B segment 306C is sent from coupler 324F to each of primary multiplexers 326B and 326D. Primary multiplexers 326E through 326H are controlled to ignore the signals going therethrough.

At secondary multiplexers 328A through 328D, any signal coming from primary multiplexers 326E through 326H is ignored. At tertiary multiplexers 330A through 330D, any signal coming from the mirrored set of primary and secondary multiplexers (not shown) are ignored. Also, any signals coming from ports 334, 336 (connected to higher and/or lower network taps) is ignored. Thus it can be seen that tertiary multiplexer 330A sends a duplicate signal of A segment 304C to port 320A. Similarly, tertiary multiplexer 330B sends a duplicate signal of B segment 306C to port 320B. In this manner, intrusion detection system 316 has access to all of the data flow in communication cable 302C. Tertiary multiplexers 330C, 330D also can be controlled to deliver a duplicate signal of A segment 304C and B segment 306C to ports 322A and 322B to be delivered to testing equipment 318.

It will be appreciated that any of the primary, secondary and tertiary multiplexers 326, 328, 330 can be controlled to allow network data signals from a certain communication cable 302A through 302F to flow to intrusion detection system 316 and/or testing equipment 318. In addition, primary and secondary multiplexers may be controlled to allow network data signals from the second group of communication cables (not shown) to be sent to intrusion detection system 316 and/or testing equipment 318. Finally, tertiary multiplexers 330 can be controlled to ignore signals from primary multiplexers 326 and secondary multiplexers 328 and to use signals coming from ports 334, 336 from a lower multiport tap.

In the embodiment of FIG. 3, the data flow between ports 320, 322 and intrusion detection system 316 and testing equipment 318 is unidirectional as indicated by the single-headed arrows. The communication flow between ports 320, 322 and intrusion detection system 316 and testing equipment 318 is illustrated with a single line, although physically these lines are embodied using several pairs of conductors. However, in other embodiments, discussed further below, network tap 300 can be configured to enable intrusion detection system 316 and/or testing equipment 318 to send device data back into network tap 300.

Figure 8:
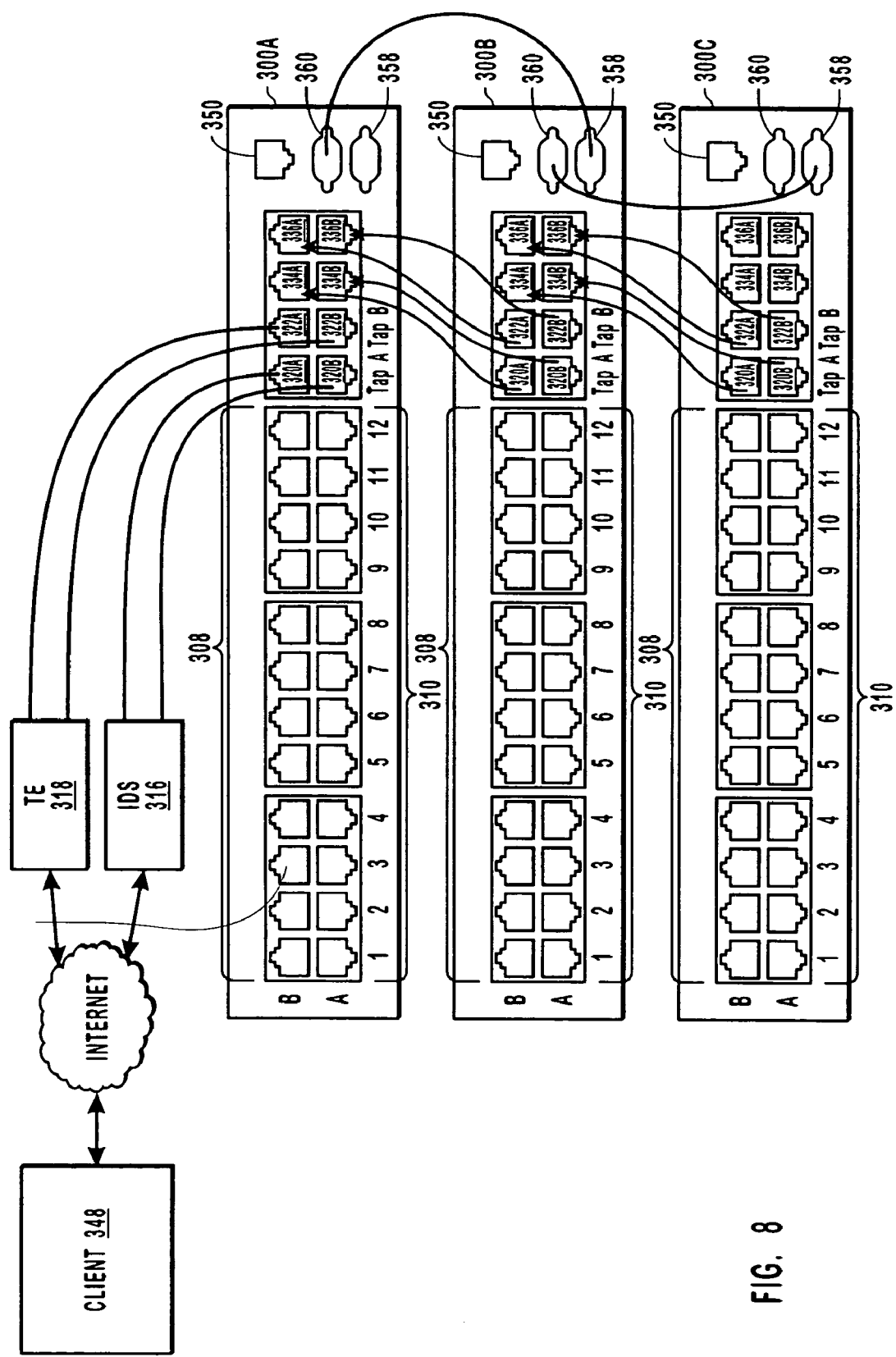
FIG. 8 illustrates a hardware configuration when a plurality of network taps are connected together in a cascading configuration.

FIG. 8 illustrates network tap 300 in a cascading configuration. Assume network tap 300 is the second in a series of three network taps 300A, 300B, 300C and that serial port 358 is an IN port and serial port 360 is an OUT port. First, the network taps 300A, 300B, 300C are connected such that their respective integrated circuitries can communicate with each other. One network tap is designated as the "master" with any other network taps being designed as "slaves," which will be discussed further below. In FIG. 8, serial IN port 358 of network tap 300B is connected to a corresponding serial OUT port in network tap 300A. Similarly, serial OUT port 360 of network 300B is connected to a corresponding serial IN port 358 in network tap 300C. Serial IN port 358 of network tap 300B allows the CPU module 362 of network tap 300A to communicate with CPU module 362 on network tap 300B. Similarly, serial OUT port 360 of network tap 300B allows CPU module 362 on network tap 300B to communicate with CPU module 362 on network tap 300C.

In addition, the communication cables from network taps 300A, 300B and 300C are configured so as to enable intrusion detection system 316 and/or testing equipment 318 to be able to monitor any one of the communication cables. In the embodiment of FIG. 8, assume that at least some of the A and B ports of each network tap 300A, 300B, 300C are connected to one or more communication cables 302. Starting with network tap 300C, at ports 320A, 320B and 322A, 322B where intrusion detection system 316 and/or testing equipment 318 would normally be connected, ports 320A, 320B and 322A, 322B are connected to ports 334A, 334B and 336A, 336B, respectively, via a communication line. The communication line connecting network tap 300A, 300B, 300C may be any electrical or fiber optic communication line. Thus, where network tap 300C would normally be connected to intrusion detection system 316, it is now placed in communication with network tap B to be connected to intrusion detection system 316. It will be appreciated that if only intrusion detection system 316 is being used, only ports 320A, 320B would need to be connected to ports 334A, 334B. Network taps 300B and 300A are connected in a similar orderly fashion. Finally, ports 320A, 320B and 322A, 322B of network tap 300A are connected to intrusion detection system 316 and testing equipment 318, respectively.

In a cascade configuration, intrusion detection system 316 and/or testing equipment 318 is placed in communication with all of the communication cables 302 in network taps 300A, 300B 300C when the network taps are connected in a cascade configuration. In the embodiment where all of the network taps have a capacity to connect to twelve communication cables, potentially thirty-six (36) communication cables may be monitored. Client device 348 can be operated to control which of the communication cables 302 will be monitored by intrusion detection system 316 and/or testing equipment 318. Client device 348 may also control any other function in any of the network taps in the cascade configuration because they are connected by serial ports 358, 360.

Figure 9:
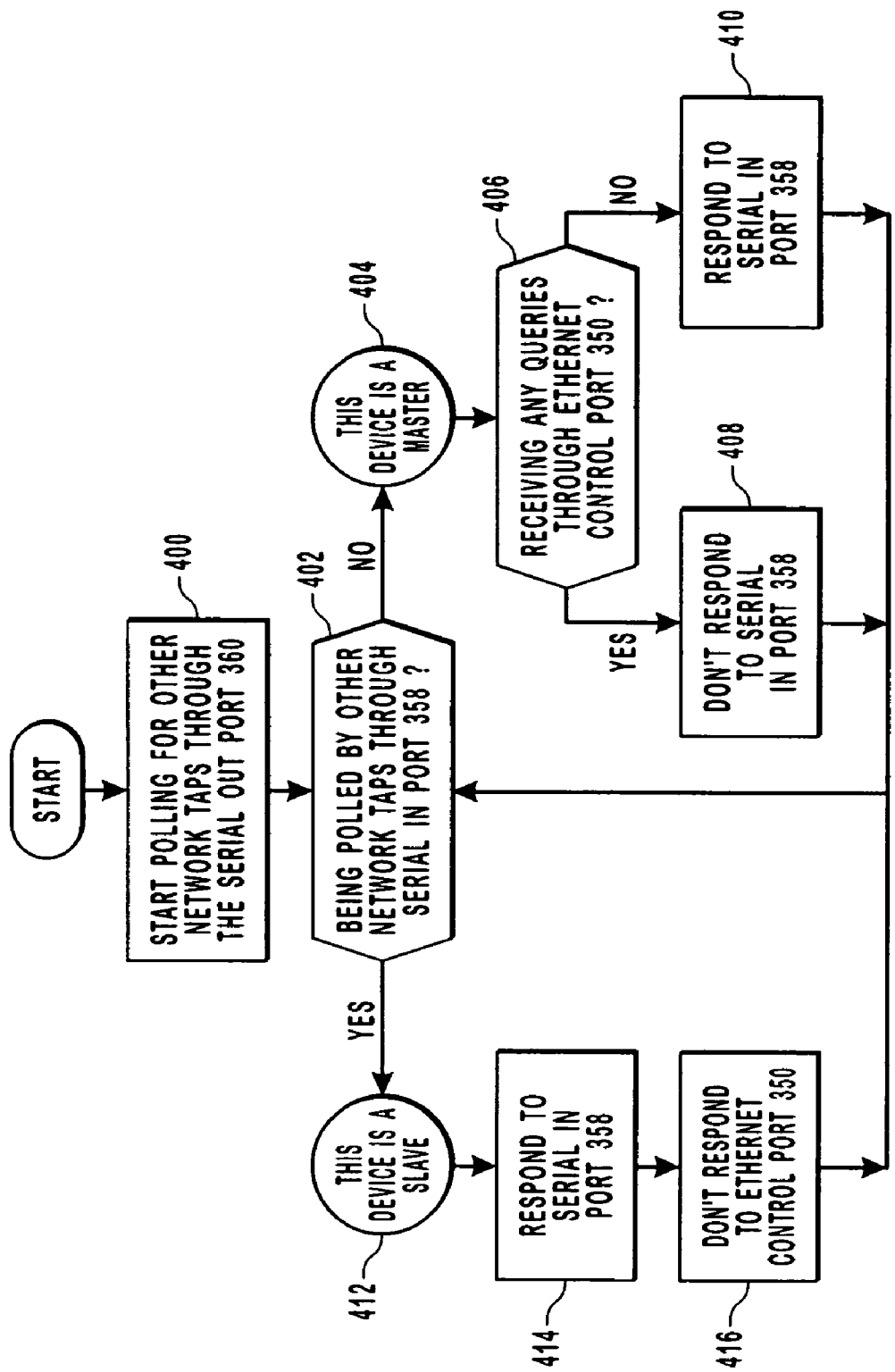
FIG. 9 illustrates a flow diagram illustrating exemplary process logic steps that the CPU module undergoes when a plurality of network taps are connected together in a cascading configuration.

It will be appreciated that, in the cascade configuration, data conflicts may occur where a network tap is connected to both a client device 348 and another network tap. That is, the network tap has a potential of receiving instructions from both Ethernet control port 350 and serial IN port 358. In the cascade configuration, the CPU module 362 in each network tap preferably follows a process logic to determine whether instructions delivered to Ethernet chip 374 or to serial port control 376 will take precedence. FIG. 9 illustrates a flow diagram laying out one set of possible logic steps each CPU module 362 in each network tap may follow. Appreciably, other process logic steps may apply depending on the particular design of network tap 300.

In general, network tap 300 is constantly "polling" through serial OUT port 360 looking for other network taps. Polling involves sending queries to connected network taps. The following process logic steps are performed on the CPU module 362 of a particular network tap 300 to decide whether that particular network tap 300 is a "master" or a "slave." The same process logic steps may be conducted on each network tap to classify the network tap as a master or slave. As used herein, the term "master" indicates that instructions will be received through Ethernet control port 350 and any data coming into serial IN port 358 will not be utilized. If, for some reason, the Ethernet control port 350 is inactive, then the serial IN port 358 will be used. The "master" primarily controls which of the communication cables will be monitored on the "slave" devices. It also passes along to the "slave" devices any management command and control signals coming from the client software. As used herein, the term "slave" indicates that instructions received from Ethernet control port 350 will not be used and, instead, instructions from serial IN port 358 will be utilized.

At step 400, CPU module 362 begins polling for other network taps through serial OUT port 360. At step 402, CPU module 362 determines whether the network tap 300 is being polled by other network taps through serial IN port 358. At step, 404, if network tap 300 is not being polled, then CPU module 362 operates as a "master." At step 406, CPU module 362 determines whether network tap 300 is receiving any queries through Ethernet control port 350. If a client software application is trying to communicate with a network tap using the Ethernet control port 350, the software application will consistently send queries to the network tap. At step 408, if queries are being received through Ethernet control port 350, then CPU module 362 does not respond to any instruction coming from serial IN port 358. The process returns to step 402 to repeat the polling process. At step 410, if queries are not being received through Ethernet control port 350, then CPU module 362 responds to instructions from serial IN port 358. The process then returns to step 402 to repeat the polling process.

At step 412, if network tap 300 is being polled through serial IN port 358, then CPU module 362 operates as a "slave." At step 414, CPU module 362 responds to instruction being received through serial IN port 358 and, at step 416, does not respond to instructions received through Ethernet control port 350. The process then returns to step 402 to repeat the polling process. Therefore, each network tap in the cascade configuration operates in an ordered manner to avoid data conflicts.

For purposes of the rest of this description, network tap 300 will not be described in the cascade configuration, although network tap 300 may have any of the same functionalities were it to be configured thusly.

Figure 10:
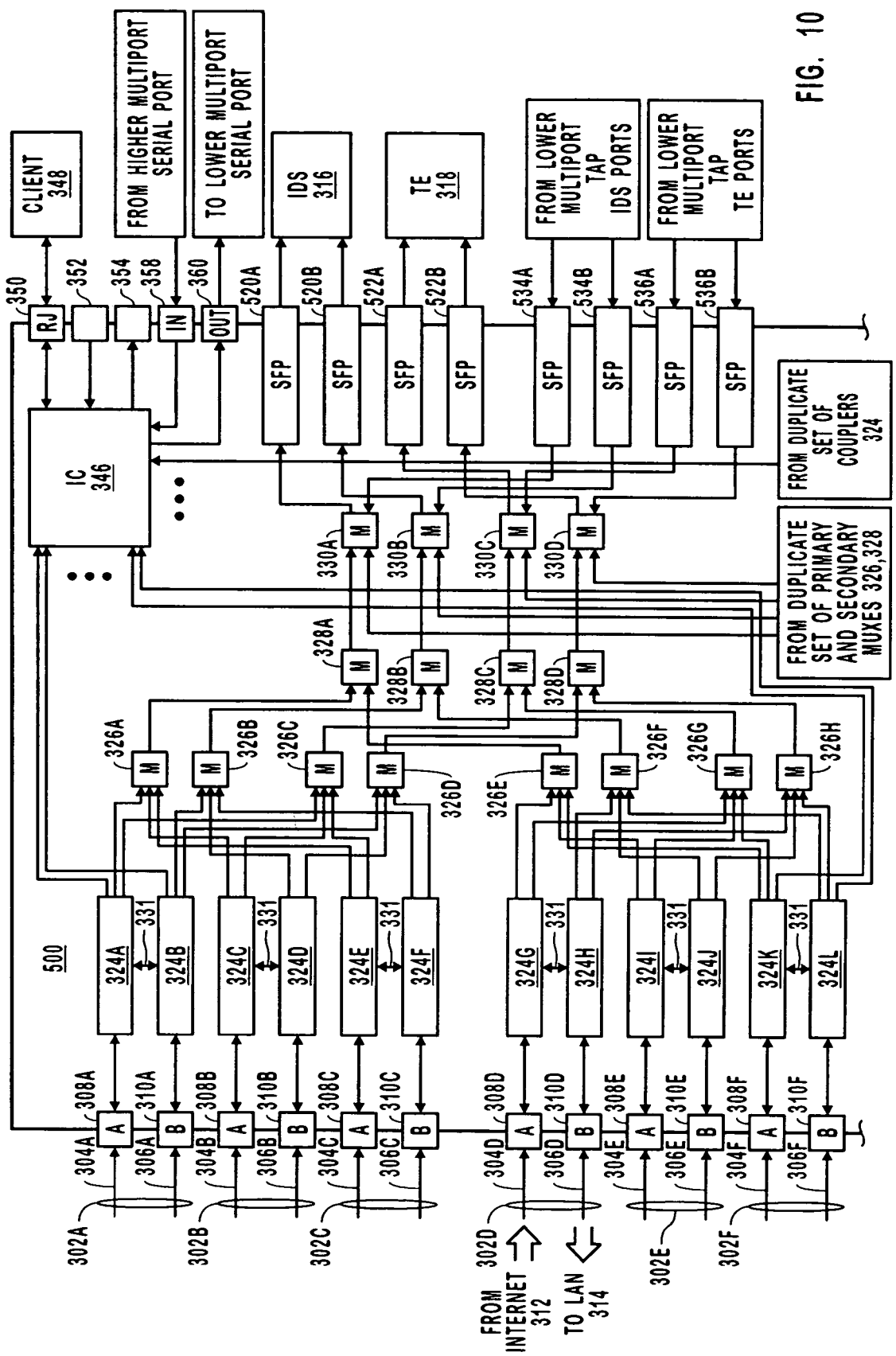
FIG. 10 illustrates another embodiment of a network tap in accordance with the present invention, illustrating a communication line between each communication cable and the integrated circuitry to allow the integrated circuitry to monitor across all communication channels.

With reference to FIG. 10, another embodiment of network tap 500 is illustrated. Many of the elements in FIG. 10 are similar to the elements in FIG. 3. As such, like elements are referred to with like reference numerals. Thus, a detailed description of network tap 500 will not be provided, except where new reference numbers are introduced.

In network tap 500, each coupler 324A through 324L transmits data to integrated circuitry 346. That is, an additional duplicate signal is formed at the fan out buffers (see FIG. 4A) in couplers 324. The duplicate signal is delivered to integrated circuitry 346. Each signal from couplers 324 represents either a duplicate signal from an A segment 304 or a B segment 306 of a communication cable 302. As such, a representation of the entire data flow of each communication cable 302 is delivered to integrated circuitry 346. The data flow in each communication cable 302 is analyzed in integrated circuitry 346 for further use, which will be described in more detail below.

In addition, FIG. 10 illustrates another alternative embodiment for couplers 332 and ports 320, 322, 334 and 336. In this embodiment, couplers 332A through 332H and their corresponding ports 320, 322 are combined into a Small Form Factor Pluggable (SFP) modules 520A, 520B and 522A, 522B which combine the functions of the couplers and ports. Similarly, couplers 332E through 332H and ports 334, 336 are combined into SFP modules 534A, 534B and 536A, 536B. SFP modules 520, 522, 534 and 536 are configured for Ethernet transmissions. In one embodiment, modules 520, 522, 534 and 536 are configured for 10/100/1000 Gigabit Ethernet transmissions. The SFP transceiver module can be plugged and unplugged from the housing of the network tap and not directly soldered thereto. This functionality allows for different types of SFP modules to be coupled to network tap 500.

In one embodiment, the SFP module is configured to couple to a conductive metallic wire connection using, for example, an RJ-45 connection. In another embodiment, the SFP module is configured to couple to an optical fiber connection using, for example, an LC™ connector. The configuration of modules 520, 522, 534 and 536 can be selected depending on the type of connection that intrusion detection system 316 or testing equipment 318 require. In addition, any external port disclosed herein may be configured to be interchangeable using, for example, an SFP module. Each SFP module is connected to integrated circuitry 346 via two communication lines. Specifically, SFP modules communicate with FPGA 364 (shown in FIG. 11). In one embodiment, SFP modules communicate with FPGA 364 using I²C protocol. The SFP modules communicate information such as, but not limited to, temperature, voltage, serial number, laser bias, and the like to FPGA 364.

Figure 11:
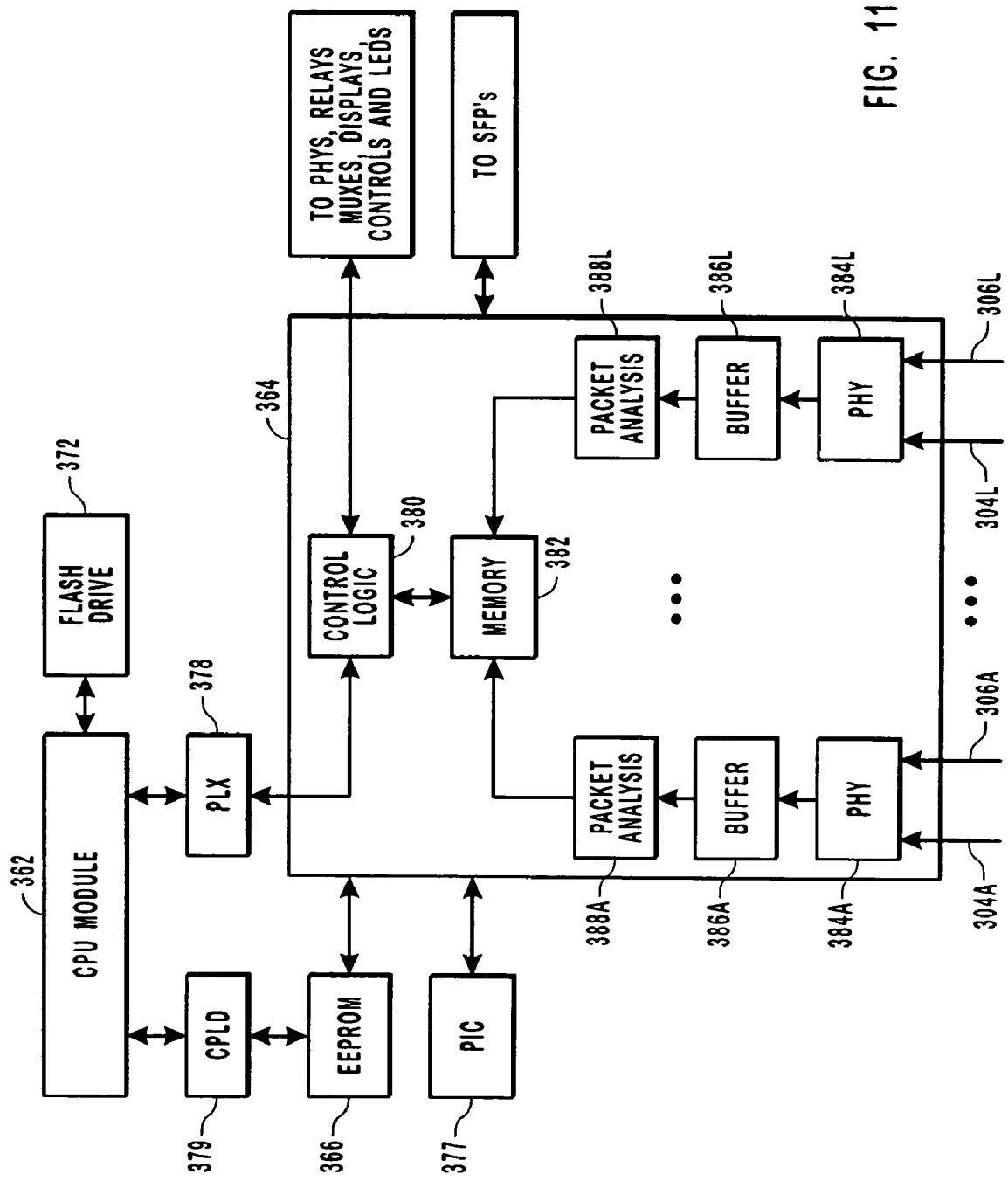
FIG. 11 illustrates the FPGA of FIG. 10 in further detail.

FIG. 11 shows one embodiment of how integrated circuitry 346 might be configured for network tap 500. As discussed above, FPGA 364 includes control logic 380. In addition, FPGA 364 includes a memory 382. FPGA 364 includes circuitry that transmits the combined network data signal for each communication cable 302A through 302L to memory 382. That is, a signal from coupler 324A carrying a representation of the network data signal carried on A segment 304A and a signal from coupler 324B carrying a representation of the network data signal carried on B segment 306A are transmitted to FPGA 364. Thus, an entire representation of the network data carried on communication cable 302A is transmitted to FPGA 364. Network tap 500 is similarly configured so that the network data of the rest of the communication cables can similarly be transmitted to FPGA 364.

The circuitry includes a physical layer device 384A through 384L, a buffer 386A through 386L and a packet analysis module 388A through 388L. Each buffer 386 holds the incoming data packets from each communication cable 302. Buffers 386 retain incoming data packets until they are ready to be analyzed by packet analysis module 388. Each packet analysis module 388 performs statistical analysis on the data packets held in buffers 386. Statistical analysis may include, but is not limited to, analyzing the data packets for whether or not the packet is idle, the packet size, CRC errors in the packet, the type of packet (http, ftp, tcp, video, etc), the priority level of the packet, and the like. The packet analysis is sent to memory 382 which may have one or more statistics tables corresponding to each communication cable 302. The statistics tables are updated in response to a new packet analysis from packet analysis modules 388. Entire packets may also be stored in memory 382 as desired. As such, FPGA 364 analyzes data on communication cables 302 and extracts statistical information. FPGA 364 can send these statistics and also any data packets of interest to CPU module 362.

Control logic 380 contains instructions on how to control components of network tap 300. Control logic 380 communicates with memory 382 and may use the statistical information contained in memory 382 to dictate how to control the components of network tap 300, which is described in more detail below with respect to FIG. 16.

In view of the foregoing, the network taps of the present invention have the ability to monitor and analyze the data flow across all channels of communication at any one time. Previous network taps were limited to monitoring only one communication cable at a time. This is because previous network taps were not robust enough to be able to handle the memory load and processing power that were required to monitor multiple channels at a time. In addition, decisions can be made based on the analysis within the network tap itself. For example, if a particular communication cable were experiencing substantial data loss, excessive noise, denial of service attacks, or an absence of expected data, the network tap 300 could alert a remote client device 348 of such status. Alternatively, CPU module could prevent the data in that communication cable from being sent to intrusion detection system 316 and/or testing equipment 318. In a cascade configuration, a communication cable transmitting too much noise may be taken out of the loop altogether.

For purposes of the rest of this description, the rest of the embodiments of the network taps of the present invention will not illustrate network data signals being sent from couplers 342 to integrated circuit 346, although any of the network taps described hereinafter may be configured to have this same functionality (and indeed in some cases will be treated as if it has this same functionality).

Figure 12:
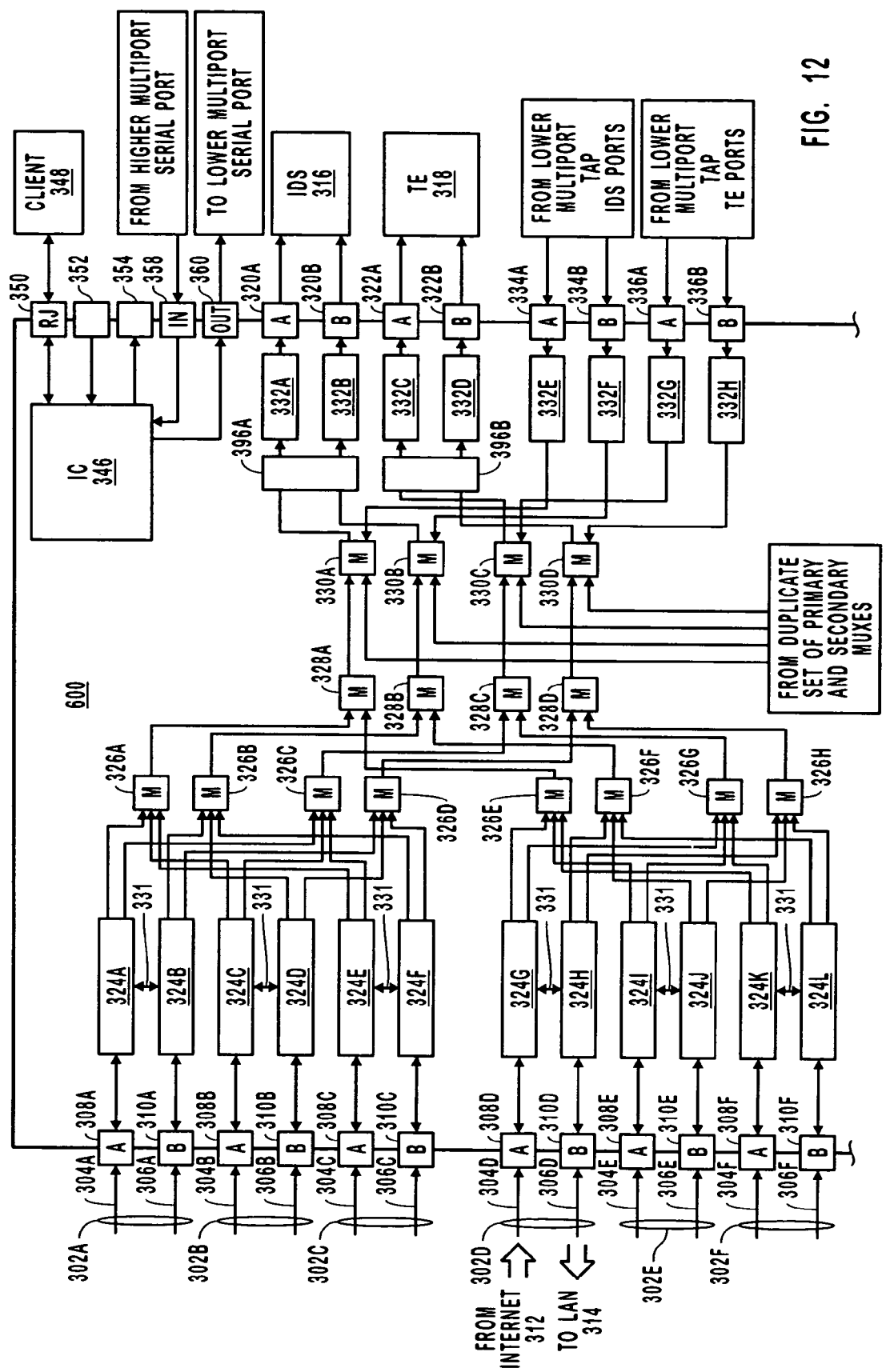
FIG. 12 illustrates yet another embodiment of the network tap according to the present invention, illustrating switches allowing different port configurations.

FIG. 12 illustrates another embodiment of network tap 600. Many of the elements in FIG. 12 are similar to the elements in FIG. 3. As such, like elements are referred to with like reference numerals. Thus, a detailed description of network tap 600 will not be provided, except where new reference numbers are introduced.

In network tap 600, a pair of switches 396A, 396B are disposed between tertiary multiplexers 330A through 330D and ports 320 and 322. Specifically, a first switch 396A is disposed in communication with multiplexers 330A and 330B and ports 320A, 320B corresponding to intrusion detection system 316. A second switch 396B is disposed in communication with multiplexers 330C and 330D and ports 322A, 322B corresponding to testing equipment 318. Using switch 396A as an example, switch 396A can (1) allow the signal from tertiary multiplexer 330A and 330B to pass through to ports 320A and 320B, respectively, (2) combine the signal from tertiary multiplexer 330A and 330B and send the combined data to one of ports 320A or 320B, or (3) after combining the signal, mirror the signal so that the combined signal can be sent to both ports 320A and 320B. It will be appreciated that switch 396B has the same functionality.

That is, switches 396A, 396B contain ports that allow communication lines coming from multiplexers 330A through 330D to be integrated into a single communication line. Thus, switches 396A, 396B combine the data flow from both incoming network data signals into a single, combined network data signal which is delivered ultimately to ports 320A and/or 320B and ports 322A and/or 322B to their respective attached devices. The resultant single network data signal can also be mirrored and a copy of each combined network data signal sent to distinct ports. One advantage of this, as will be discussed below, is that different attached devices may be attached to, e.g., ports 320A and 320B. Switches 396A, 396B thus enable ports 320A, 320B and ports 322A, 322B with multiple port configurations, which will be discussed in more detail below with respect to FIG. 13.

Figure 13A:
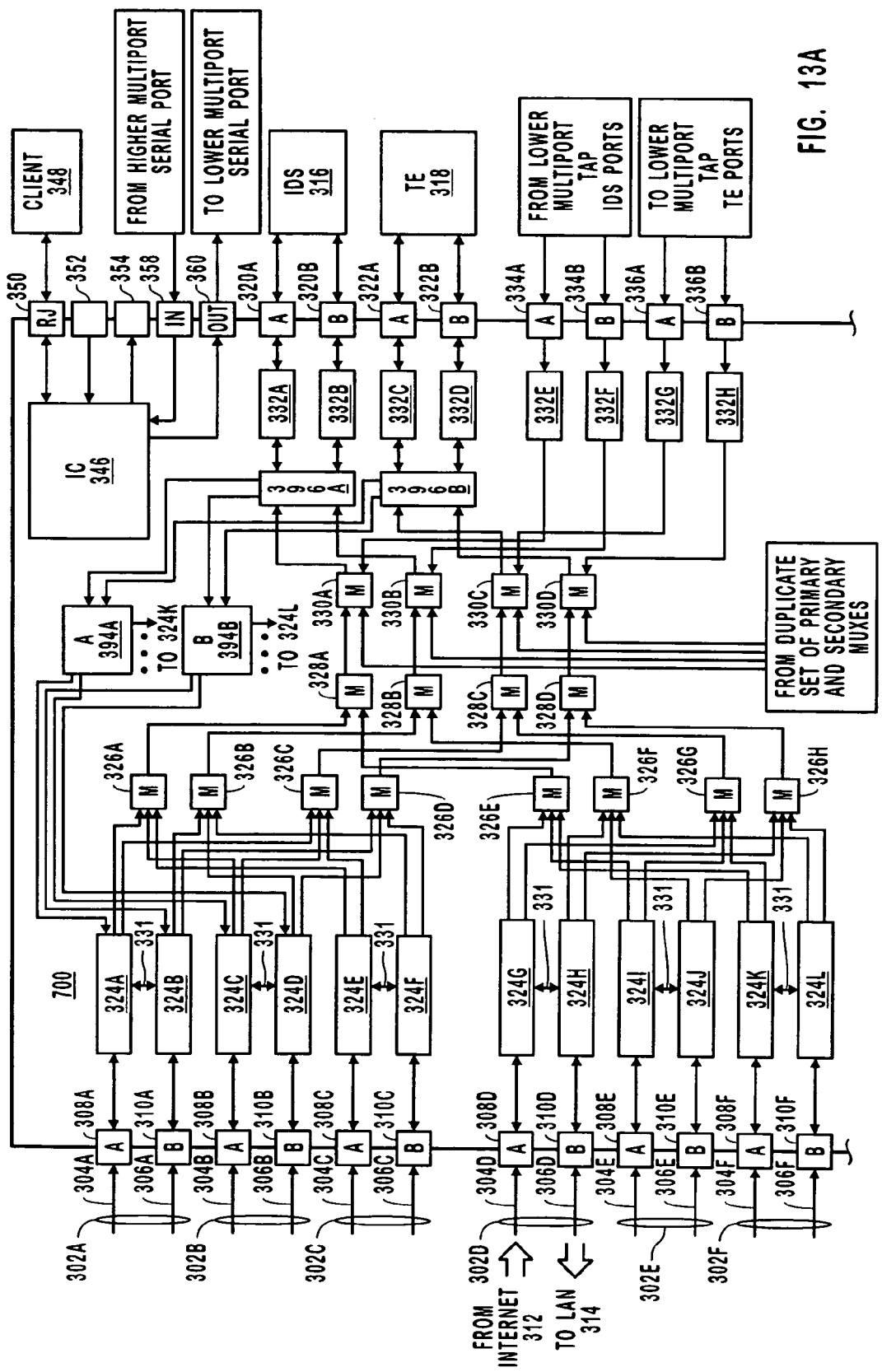
FIG. 13A illustrates still another embodiment of the network tap of the present invention, illustrating switches allowing reverse data flow from the testing equipment and/or intrusion detection system back into the network tap and also different port configurations.

FIG. 13A illustrates another embodiment of network tap 700 having substantially the same elements as network tap 600. Network tap 700 enables intrusion detection system 316 and/or testing equipment 318 to send data back into network tap 700. As used herein, the term "device data" may be instructions from the attached device, messages to be sent to other components of the network, or, in this particular application, a control signal in the form of one or more kill packets.

Network tap 700 includes fan out buffers 394A, 394B which are disposed in communication between switches 396A, 396B and couplers 324A through 324L. As illustrated in FIG. 13A, a return path is formed from ports 320A, 320B to switch 396A. A similar return path is formed between ports 322A, 322B and switch 396B. At switch 396A, the data signals from ports 320A, 320B is combined and duplicated or mirrored. A copy of the device data is sent to fan out buffers 394A, 394B. Switch 396B similarly combines and mirrors the data signals from ports 322A, 322B and sends a copy of the data to each of fan out buffers 394A, 394B.

Fan out buffers 394A, 394B create multiple copies of the device data transmitted thereto. Fan out buffer 394A is connected to all of the couplers 324 corresponding to the A segment of each communication cable 302. Similarly, fan out buffer 394B is connected to all of the couplers 324 corresponding to the B segment of each communication cable 302. Thus, switch 396A sends the device data to either fan out buffer 394A or 394B depending on whether the device data is intended to be delivered through the A segment (the Internet) or the B segment (the LAN) of a particular communication cable 302. In addition, switch 396A can duplicate and/or mirror the device data and transmit a representation to each fan out buffer 394A, 394B so that device data is sent in both directions.

Figure 13B:
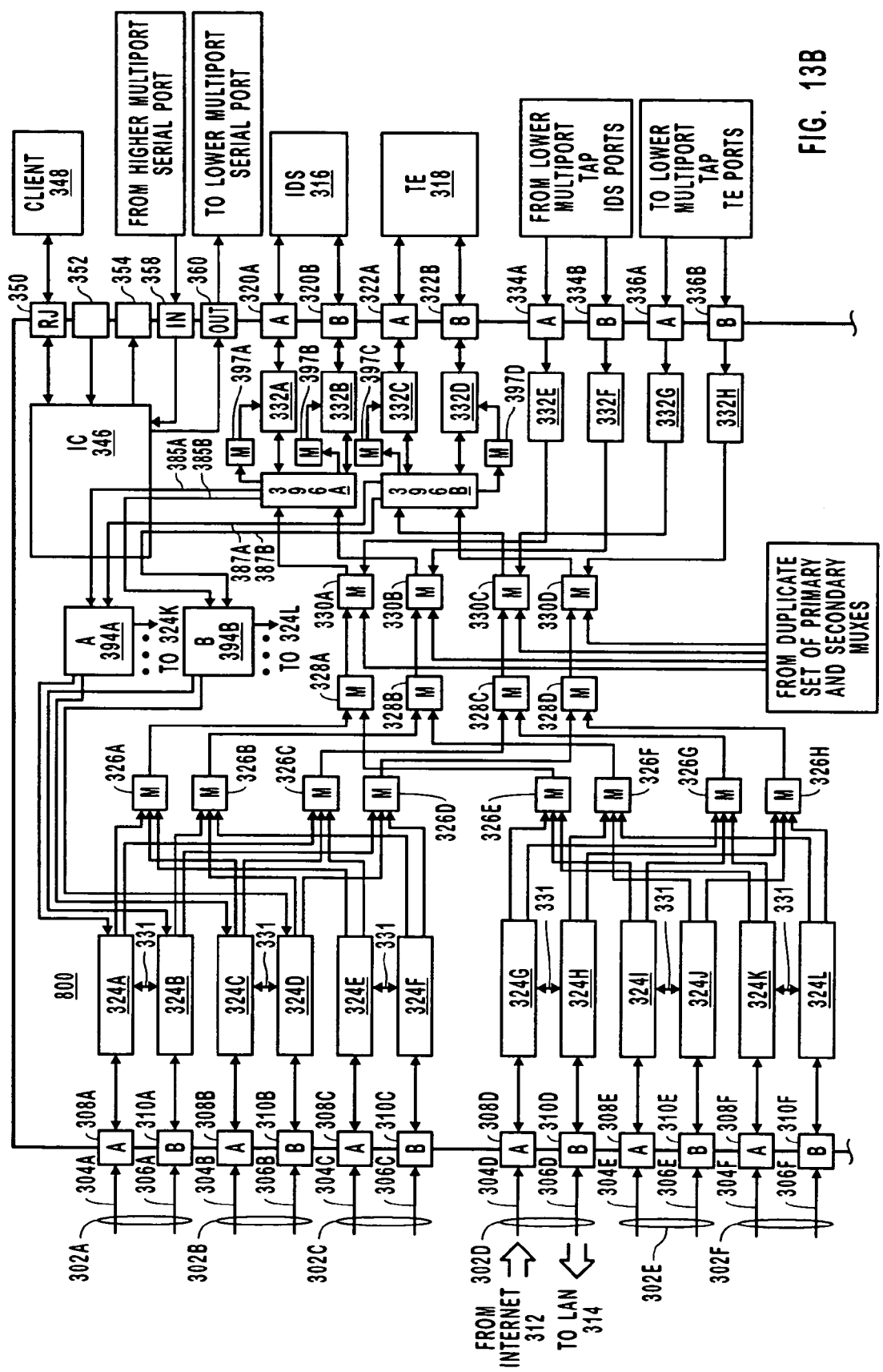
FIG. 13B illustrates another embodiment of the network tap of the present invention, illustrating integrated circuitry being configured to monitor and analyze return device data.

FIG. 13B illustrates an alternative embodiment of network tap 800. In this embodiment, the return device data from switches 396A, 396B passes through integrated circuitry 346 first before being sent on to fan out buffers 394A, 394B. For purposes of discussion, the communication lines from switches 396A, 396B to integrated circuitry 346 have been identified to assist in discussion. Specifically, switches 396A, 396B duplicate the return device data. Thus, switch 396A transmits communication line 385A, 385B and switch 396B transmits communication line 387A, 387B. Communication lines 385A, 385B and 387A, 387B are transmitted to FPGA 364 as will be discussed below. Thus, integrated circuitry 346 has access to the data flow between switches 396A, 396B and fan out buffers 394A, 394B. Integrated circuitry 346 can monitor the data signals and send information to client device 348 relating to the device data.

In addition, FIG. 13B illustrates an alternative embodiment for the switch configuration which allows increased functionality of the network taps of the present invention. As illustrated therein, switch 396A is connected to multiplexers 397A, 397B. Multiplexers 397A, 397B are, in turn, connected to couplers 332A, 332B, respectively. Similarly, switch 396B is connected to multiplexers 397C, 397D, which are, in turn, connected to couplers 332C, 332D, respectively. The additional multiplexers 397A through 397D add additional functionality. For example, the additional multiplexers allow a user to enable or disable the switching function of switches 396A, 396B. In addition, ports 320A, 320B corresponding to intrusion detection system 316 could be enabled with switching functionality while ports 322A, 322B corresponding to testing equipment 318 could be disabled and vice versa.

The ability to disable the switching functionality of the ports may be useful if the switching functionality is not particularly required in a certain instance which would decrease the power consumption of the network tap, provide a shorter delay between the incoming ports 308, 310 and tapping ports 320, 322, among other advantages. Additionally, should the switches 396A, 396B become disabled, for any reason, the additional multiplexers 397A through 397D provide a backup route for the duplicate network data signals, thus maintaining most tapping functionalities even in the event of failure of the switches.

FIGS. 14A and 14B illustrate one embodiment of the circuit components for couplers 324 and 332 for network tap 700. Couplers 324A and 324B include relays 338, transformers 340, physical layer devices 342 and fan out buffers 344. In addition, couplers 324A, 324B include multiplexers 392A, 392B. The embodiment of FIG. 14A is different from FIG. 5A in that the instead of the duplicate network data signal from the fan out buffer 344A of coupler 324A going directly to the physical layer device 342B of coupler 324B, it is instead rerouted to multiplexer 392B of coupler 324B. Similarly, the duplicate network data signal from fan out buffer 344B of coupler 324B is directed to multiplexer 392A of coupler 324A instead of physical layer device 342A.

One of the duplicate device data signals from fan out buffer 394A is delivered to multiplexer 392A. The device data is transmitted to physical layer device 342A, transformer 340A, and relay 338A back through port 308A to the Internet. In a similar fashion, one of the duplicate device data signals from fan out buffer 394B is delivered to multiplexer 392B. The device data is transmitted to physical layer device 342B, transformer 340B, and relay 338B to port 310A to the LAN.

Thus, two possible inputs are sent to multiplexers 392A, 392B. The multiplexers 392 are controlled to allow network data and device data from the two inputs to be sent to the corresponding physical layer device 342 and thus, to the corresponding ports 308, 310. Since network data can be carried on both inputs, multiplexers 392 may select either input for that particular information. However, the input from the fan out buffers 394 will be the only input having device data. So, when device data is present, the multiplexers must necessarily select the input from the fan out buffers 394.

Regarding couplers 332, a more complete circuit configuration is shown in FIG. 14B, illustrating switch 396A disposed between multiplexers 330A, 330B and physical layer devices 342C, 342D. Note that FIGS. 13A, 13B and 14B contain double-headed arrows between switch 396A, physical layer devices 342C, 342D, transformers 340C, 340D and ports 320A, 320B to indicate that bi-directional flow of data is possible.

Figure 15A:
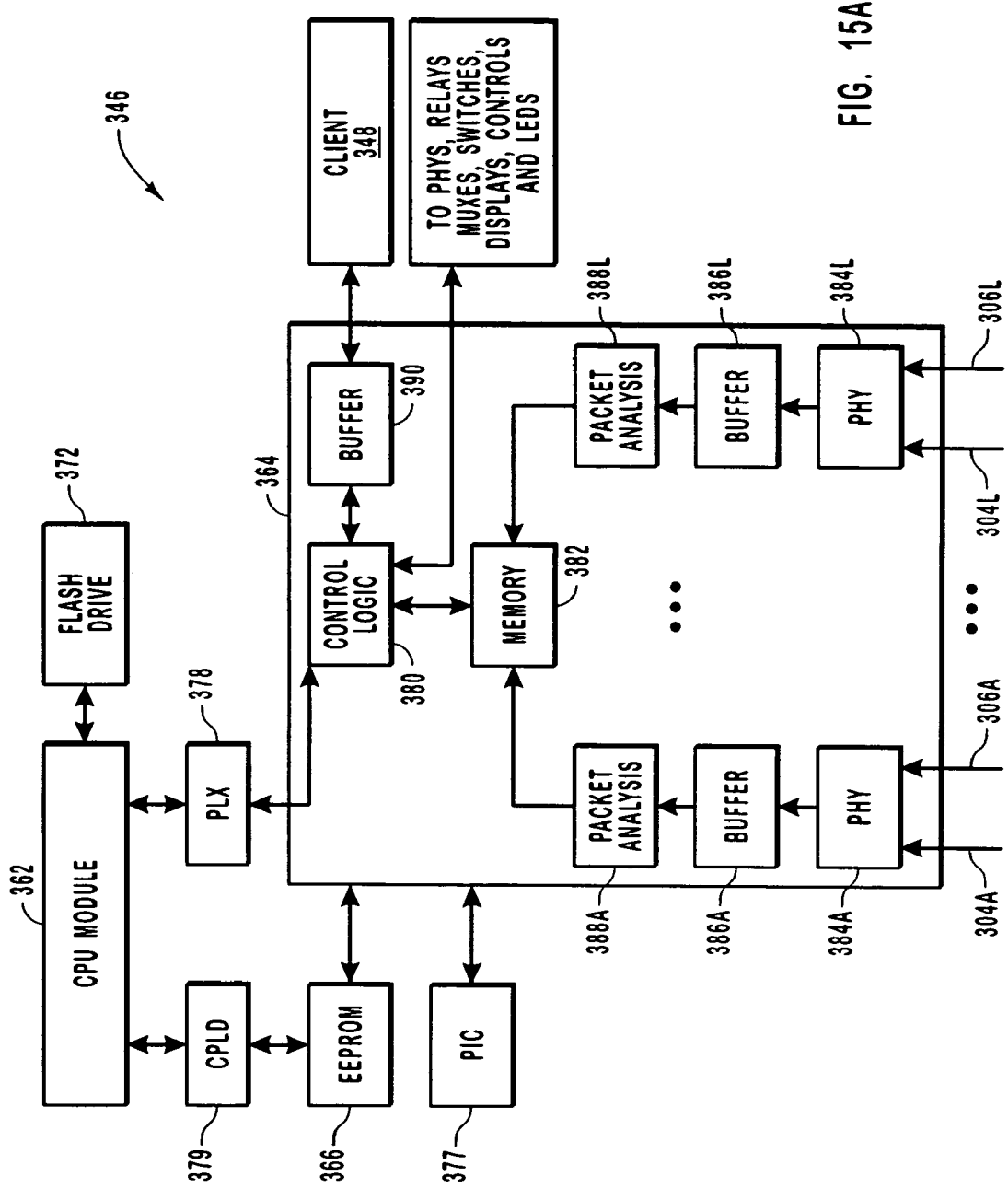
FIG. 15A illustrates the FPGA of the network tap of FIG. 13A in further detail.

FIG. 15A illustrates an exemplary integrated circuitry 346 for any embodiment of network tap in which statistical extraction by a remote device is possible. FIG. 15A is similar to FIG. 11 except that FPGA 364 includes a buffer 390, which function is described in more detail below. In network taps 500, 600 and 700, integrated circuitry 346 can be configured to control the additional network components including, but not limited to, switches 396A, 396B, fan out buffers 394A, 394B, and multiplexers 392A, 392B, In one embodiment, integrated circuitry 346 is configured to control the ability of switches 396A, 396B to allow incoming device data from intrusion detection system 316 and/or testing equipment 318. Essentially, this provides network tap 700 with an "enable" or "disable" mode—in the "enable" mode, backflow data from attached devices such as intrusion detection system 316 and/or testing equipment 318 is allowed; in the "disable" mode, switches 396A, 396B do not accept device data transmissions from attached devices. Thus, controls 352 (FIG. 3) may provide manual means for enabling a user to enable/disable the bi-directional communication between network tap 700 and attached devices. Alternatively, remote means may be provided through client device 348 and integrated circuitry 346. This may be advantageous, for example, where the user desires to substitute the intrusion detection system 316 and/or testing equipment 318 with other equipment. The enable/disable feature may be applied to any embodiment disclosed herein. The enable/disable feature is further discussed in detail with respect to FIGS. 17A through 17G.

As illustrated in FIG. 13A, ports 320A, 320B and 322A, 322B allows bi-directional flow of data therethrough as indicated by the double-headed arrows. Ports 320A, 320B and 322A, 322B are thus configured to receive various types of device data from the attached device, intrusion detection system 316 or testing equipment 318. Device data may be instructions from the attached device, messages to be sent to other components of the network, data packets to be inserted into the network, or, in another embodiment, a control signal in the form of one or more kill packets.

The return path functionality of network tap 700 will be described with reference to intrusion detection systems, although it may apply to various other types of systems. When an intrusion detection system 316 is used, usually a firewall (not shown) is connected to the A segment 304 or B segment 306 of communication line 302 so that data signals coming from Internet 312 must first pass through the firewall. For purposes of this description, it will be assumed that the A segment 304 for each communication line 302 is connected to the Internet while the B segment 306 is connected to the LAN.

When intrusion detection system 316 identifies intrusive activity, it sends a kill packet through ports 320A and/or 320B to coupler 332A and/or 332B. The kill packet is sent from coupler 332A and/or 332B to switch 396A. The kill packet contains header information such that switch 396A can direct the kill packet to the Internet or to the LAN. If the kill packet is intended to go toward the Internet, and consequently, the firewall, switch 396A directs the kill packet to fan out buffer 394A. Fan out buffer 394A sends a copy of the kill packet to each A segment coupler 324A, 324C, 324E, 324G, 324I and 324K. The multiplexers 392 in couplers 324 determine whether to transmit the kill packet to their respective A ports 304, which is in the data flow of the firewall. The kill packet sent from intrusion detection system 316 instructs the firewall to prohibit further data flow from the intrusive source.

The kill packet can also be addressed to another network node in the local area network. For example, at switch 396A, the kill packet can be sent to fan out buffer 394B. Fan out buffer 394B sends a copy of the kill packet to each B segment coupler 324B, 324D, 324F, 324H, 324J and 324L. The multiplexers 392 in couplers 324 determine whether the transmit the kill packet to their respective B ports 306. The kill packet is then sent on to the LAN or other designated node. For example, when an intrusion is detected, another kill packet is sent to switch 396A to prevent further intrusions through the other network node into the LAN. This second kill packet can be sent at substantially the same time as the first kill packet so that both ends of the main communication cable 302 are protected from the intrusion.

It will be appreciated that switches 396A, 396B represents a hub for data packets coming from the Internet 312, LAN 314, and attached devices 316, 318. Switches 396A, 396B examine the destination address in the header of each data packet and sends the data packet to the corresponding port. Thus, switches 396A, 396B prevent the collision of data by coordinating data flow therethrough. In one embodiment, switches 396A, 396B are Ethernet switches. The process by which an Ethernet switch directs the flow of data is well known in the art. A suitable Ethernet switch is the Scalable 12-Port Gigabit Ethernet MultiLayer Switch manufactured by Broadcom located in Irvine, Calif.

Figure 15B:
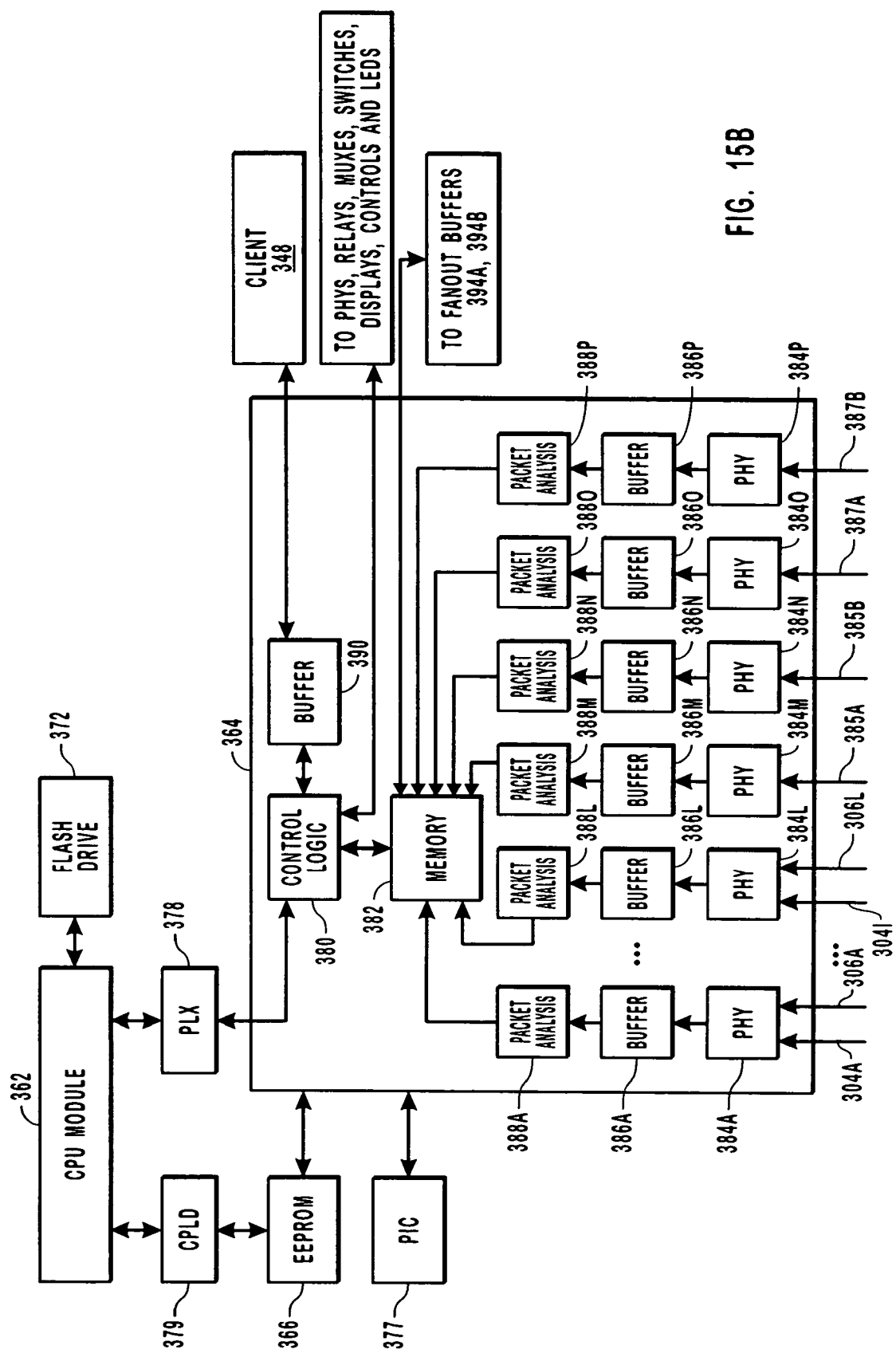
FIG. 15B illustrates the FPGA of the network tap of FIG. 13B.

FIG. 15B illustrates an embodiment of FPGA 364 for network tap 800. As discussed above, each communication line from switches 396A, 396B containing return device data is transmitted to FPGA 364 before being sent on to fan out buffers 394A, 394B. The circuitry includes a physical layer device 384M through 384P, a buffer 386M through 386P, and a packet analysis module 388M through 388P. Each communication line 385A, 385B, 387A, and 387B are sent to a series of circuitry components (i.e., physical layer device, buffer, and packet analysis module), similar to the configuration of FIG. 15A. The return device data is analyzed, statistics gathered and stored in memory 382. Control logic 380 communicates with memory 382 and may use the statistical information contained in memory 382 to dictate how to control the components of network tap 300. After the return device data undergoes the statistical analysis in FPGA 364, it is transmitted to fan out buffers 394A, 394B from memory 382.

In another embodiment, not shown, FPGA 364 can be modified so that it replaces the function of switches 396A, 396B. FPGA 364 can be programmed to coordinate the flow of device data from an intrusion detection system to a firewall. In this embodiment, FPGA 364 could include multiple buffers that would coordinate the flow of data so that data collisions are avoided. This embodiment of FPGA 364 having multiple buffers is disclosed in more detail in co-pending U.S. patent application Ser. No. 10/409,006, filed Apr. 7, 2003, and entitled "Network Tap For Use With Intrusion Detection Systems," herein incorporated by reference in its entirety.

Figure 16:
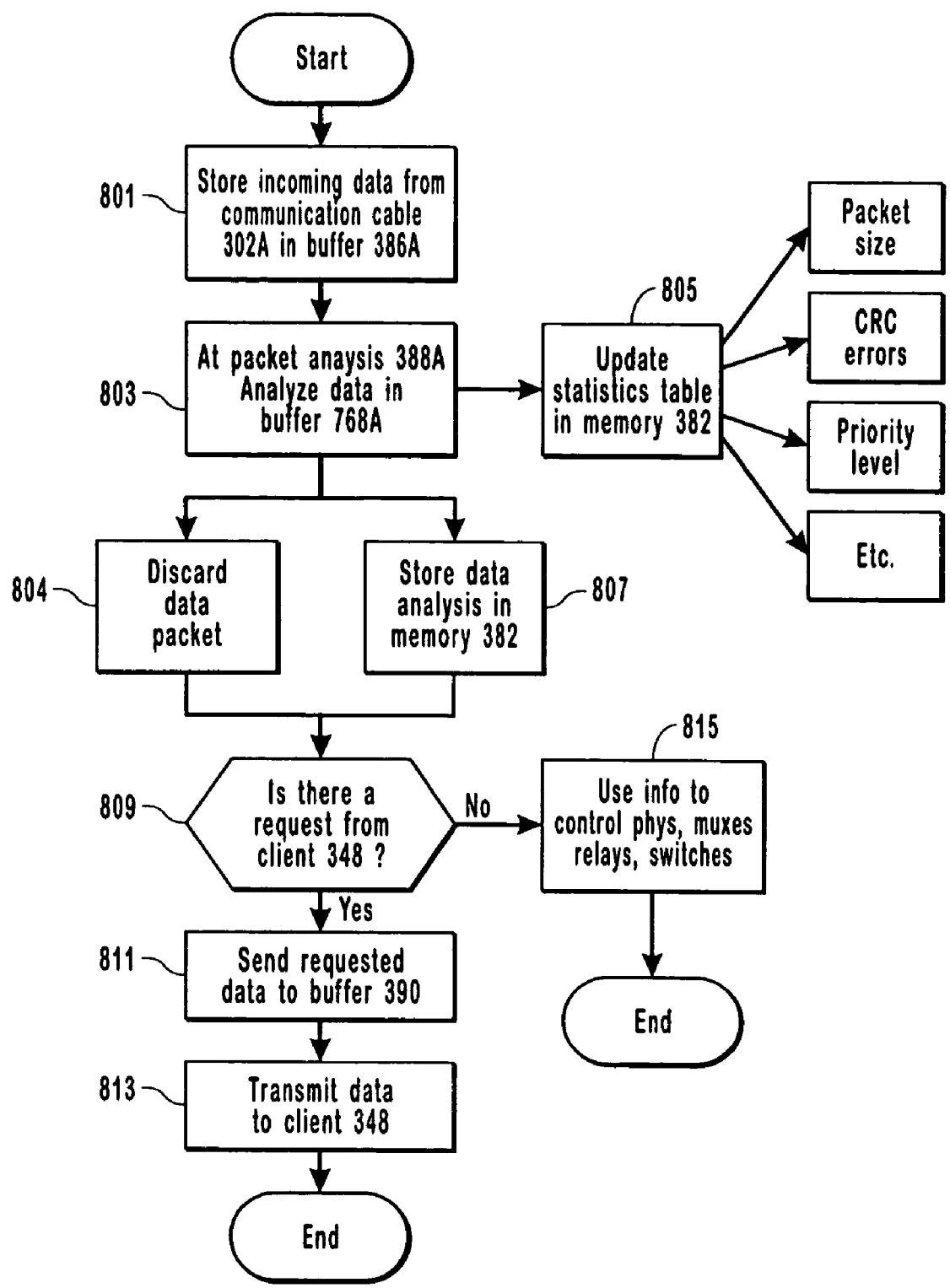
FIG. 16 illustrates a flow diagram of the process logic for the FPGA of FIG. 13A and 13B.

FIG. 16 illustrates a process logic flow diagram for FPGA 364 in one embodiment where fan out buffers 394A, 394B send a copy of a data signal to integrated circuitry 346. In this embodiment, FPGA 364 is able to function as a statistical collector. In this description, communication cable 302A will be used as an example of a communication cable that is analyzed, but it will be appreciated that statistics may be obtained from any communication cable 302A through 302L and those communication cables in the duplicate group not shown.

At step 801, incoming data from communication cable 302 is stored in buffer 386A. At step 803, packet analysis module 388A analyzes the data, depending on the type of predetermined statistics a user desires. For example, packet analysis module 388A may determine the packet size, existence of CRC errors, the packet type (http, ftp, tcp, video, etc), priority level and the like. At step 804, the data packet may be discarded if not necessary for any further analysis. Alternatively, at step 805, packet analysis module 388A may update a statistics table stored in memory 382. At step 807, the data analysis is stored in the local memory 382.

FPGA 364 may then do a number of things with the data stored in local memory 382. In one instance, FPGA 364 can respond to a request from client device 348. At step 809, client device 348 requests data from FPGA 364. At step 811, packet analysis module 388A processes the request and writes the requested data into buffer 390. At step 813, packet analysis module 388A sends the requested data in buffer 390 to client device 348.

FPGA 364 may also use the data stored in local memory 382 to enable it to control switches, physical layer devices, multiplexers or relays. At step 815, control logic 380 accesses the data stored in local memory 382 to instruct it how to control or operate components of the network tap.

FIGS. 17A through 17G illustrate the various modes and port configurations possible in embodiments of the network taps of the present invention. Integrated circuitry 346 enables network tap 600 or 700 to operate in different modes, which modes provide various port configurations. Integrated circuitry 346 (via FPGA 364) controls switches 396A, 396B. Switches 396A, 396B are enabled to perform three basic functions so that selection of one or more of the functions produces different port configurations. Switch 396A can (1) allow the signal from tertiary multiplexer 330A and 330B to pass through to ports 320A and 320B, respectively, (2) combine the signal from tertiary multiplexer 330A and 330B and send the combined data to one of ports 320A or 320B, or (3) after combining the signal, mirror the signal so that the combined signal can be sent to both ports 320A and 320B. In addition, switch 396A can also provide a return path. When return data is received from one of ports 320A or 320B, switch 396A sends the data to fan out buffers 394A or 394B. In one embodiment, switch 396A duplicates the data and sends the information to both fan out buffers 394A and 394B. It will be appreciated that switch 396B has the same functionality. Manipulation of these functions produces the various modes and port configurations that will now be discussed.

The various port configurations of network taps 600, 700 and 800 may be enabled, disabled, added, deleted and/or modified in various ways. New code may be loaded to FPGA 364. Switches/buttons/controls 352 or client device 350 may be used to activate/deactive, add/delete, and/or modify features. Other methods such as cryptography methods, such as RSA, Public-Key Infrastructure (PKI), digital signature standard (DSS), and the like could be used. Such security software could assist in identifying valid users and devices and either restrict or enable their ability to access and manage the network tap.

Network tap 600 or 700 can operate in a "passive mode." That is, switches 396A, 396B can be disabled so that the network data goes directly from the tertiary multiplexers 330A through 330D to multiplexers 397A through 397D.

Figure 17A:
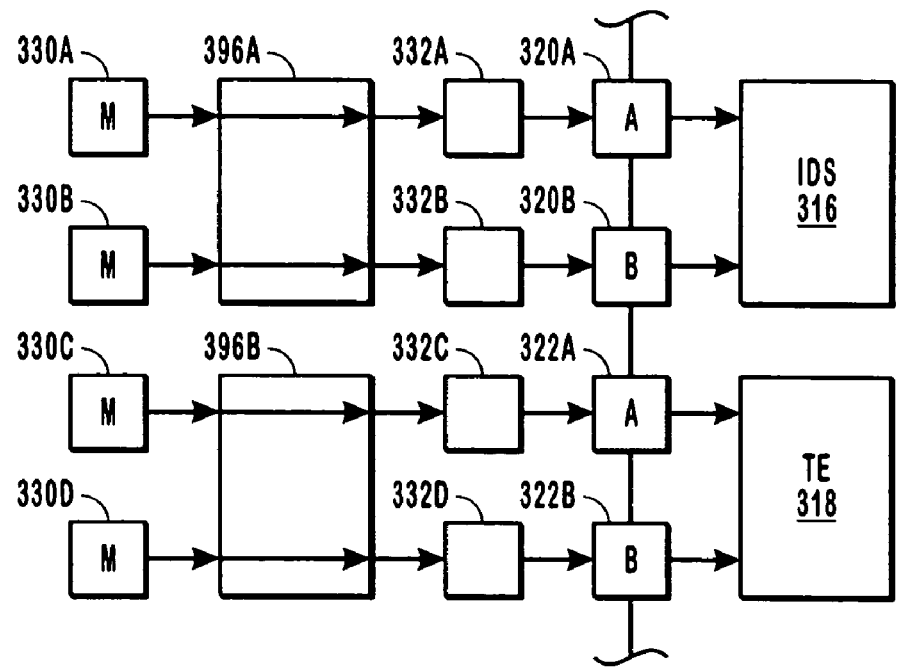
FIGS. 17A through 17G illustrate various modes and port configurations that are possible in the embodiment of FIGS. 12, 13A and 13B.

As illustrated in FIG. 17A, the first mode is a "pass through" mode. In the "pass through" mode, switches 396A, 396B do not utilize the switching capabilities or duplicating functionalities of the switch chip. The switch is active in only routing the data through to the corresponding attached device. In the "pass through" mode both intrusion detection system 316 and testing equipment 318 are allowed to receive network data through ports 320, 322. However, any device data entering the network tap 600 or 700 from intrusion detection system 316 and/or testing equipment 318 is not used, even though ports 320, 322 are configured for bi-directional data flow. This configuration of ports 320, 322 in the "pass through" mode is indicated by the unidirectional arrows in FIG. 17A.

The term "enabled to transmit network data" is used to refer to a port that allows network data therethrough. The term "disabled from transmitting network data" is used to refer to a port which cannot transmit network data due to how integrated circuitry 346 controls components in network tap 600 or 700. The term "enabled to transmit device data" is used to refer to a port which is allowed to transmit device data therethrough, which device data is further used by components of network tap 600 or 700. In contrast, the term "disabled from transmitting device data" is used to refer to a port that allows device data therethrough, but which device data is not used in network tap 600 or 700 due to how integrated circuitry 346 controls components of network tap 600 or 700. Thus, in the "pass through" mode, ports 320, 322 are all enabled to transmit network data. Ports 320, 322 are disabled from transmitting device data.

Further, in the "pass through" mode, both ports 320A, 320B are required to properly connect intrusion detection system 316. Similarly, both ports 322A, 322B are required to properly connect testing equipment 318. In addition, intrusion detection system 316 would require an additional communication line and external switch to communicate with the firewall (not shown) connected to the Internet 312. Thus, it will be appreciated that network tap 600 or 700 can be operated in a completely passive manner. However, the "pass through" mode may be advantageous where switches 396A, 396B obtain statistics regarding the data flow in the main communication cables 302. As illustrated in FIG. 13, switches 396A, 396B may be directly connected to integrated circuitry 346 to deliver these statistics and send them to client device 348.

Figure 17B:
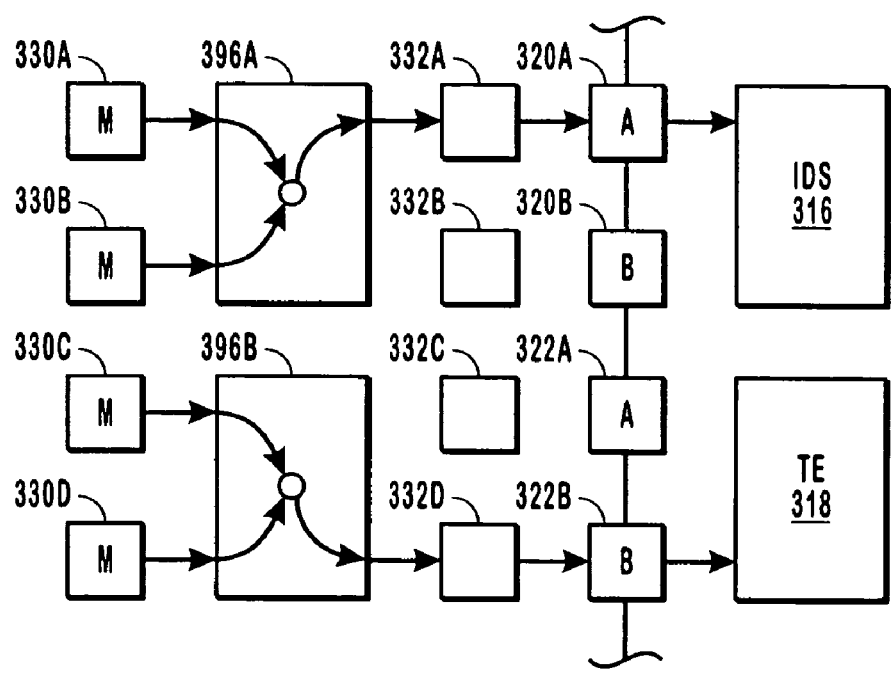

The second mode is a "combined mode." In the combined mode, switches 396A, 396B combine the incoming data signals and send it to one outgoing port. As illustrated in FIG. 17B, the outgoing, combined data signal can be sent to either the A port or the B port of ports 320 and 322. Thus, an attached device, such as intrusion detection system 316 or testing equipment 318, can be connected to network tap 600 or 700 by a single cable. This may be advantageous where some manufacturers of analyzing equipment provide connection through a single cable in a passive manner. FIG. 17B shows unidirectional arrows between port 320A and intrusion detection system 316 and port 322B and testing equipment 318 to indicate the uni-directional nature of ports 320, 322 in this embodiment.

Figure 17C:
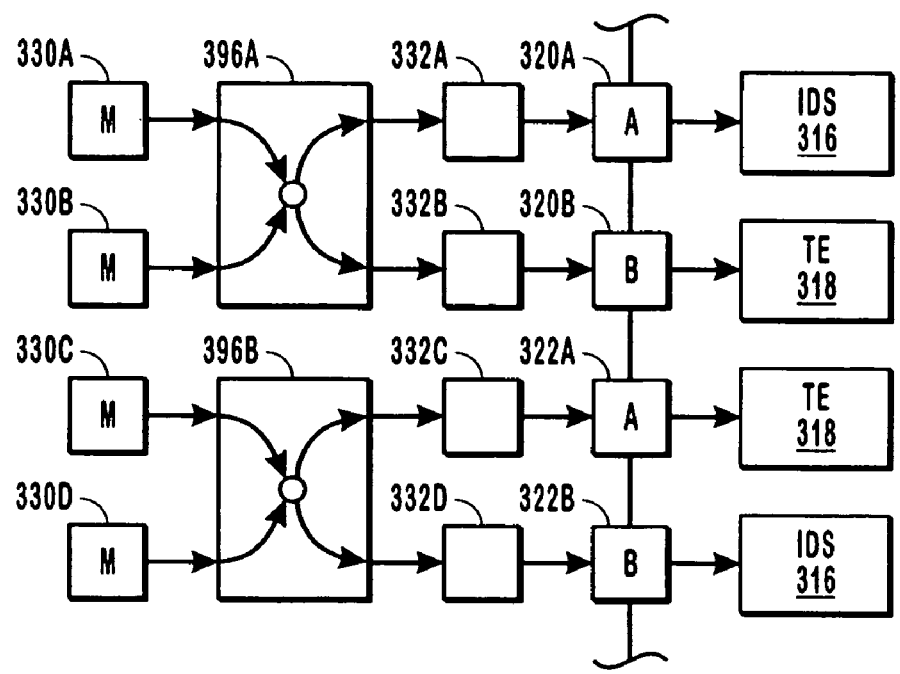

The third mode is the "combined/mirrored" mode. As depicted in FIG. 17C, switches 396A, 396B combine the data signals from multiplexers 330A through 330D. The combined data signal is then mirrored or duplicated by switches 396A, 396B. A copy of each combined data stream is then delivered to each port. For example, port 320A and 320B receive the same information. A discrete attached device can then be connected to each port because each port 320, 322 will contain a representation of the network data carried on communication cable 302. Thus, effectively four tap ports are provided each having a complete representation of network data. This allows potentially four attached devices to be connected to the network taps of the present invention. The potential to have four tap ports is possible with any embodiment implementing the combined/mirror mode. Thus, the embodiments of FIG. 17D and 17E also have the capability of connecting to potentially four attached devices. As in FIGS. 17A and 17B, the directional flow of data is uni-directional as illustrated by the uni-directional arrows.

Figure 17D:
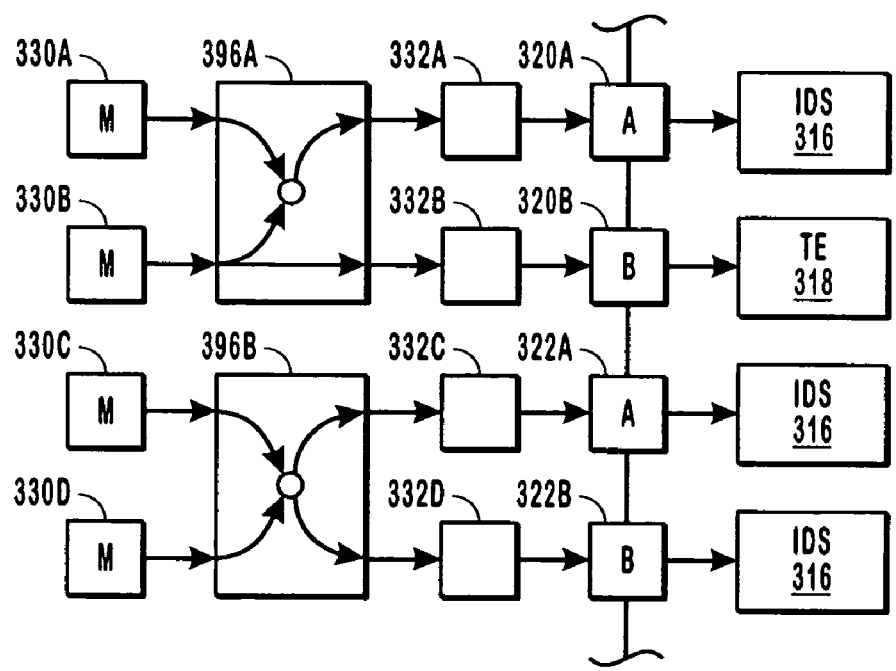

The fourth mode is the "combined/mirrored/pass through" mode. As shown in FIG. 17D, the combining function of switches 396A, 396B can operate simultaneously with the pass-through function of the switches. Thus, a set of data can be combined and delivered to one port 320A while a portion of the data can be passed through to port 320B. A separate attached device is attached to ports 320A and 320B.

Figure 17E:
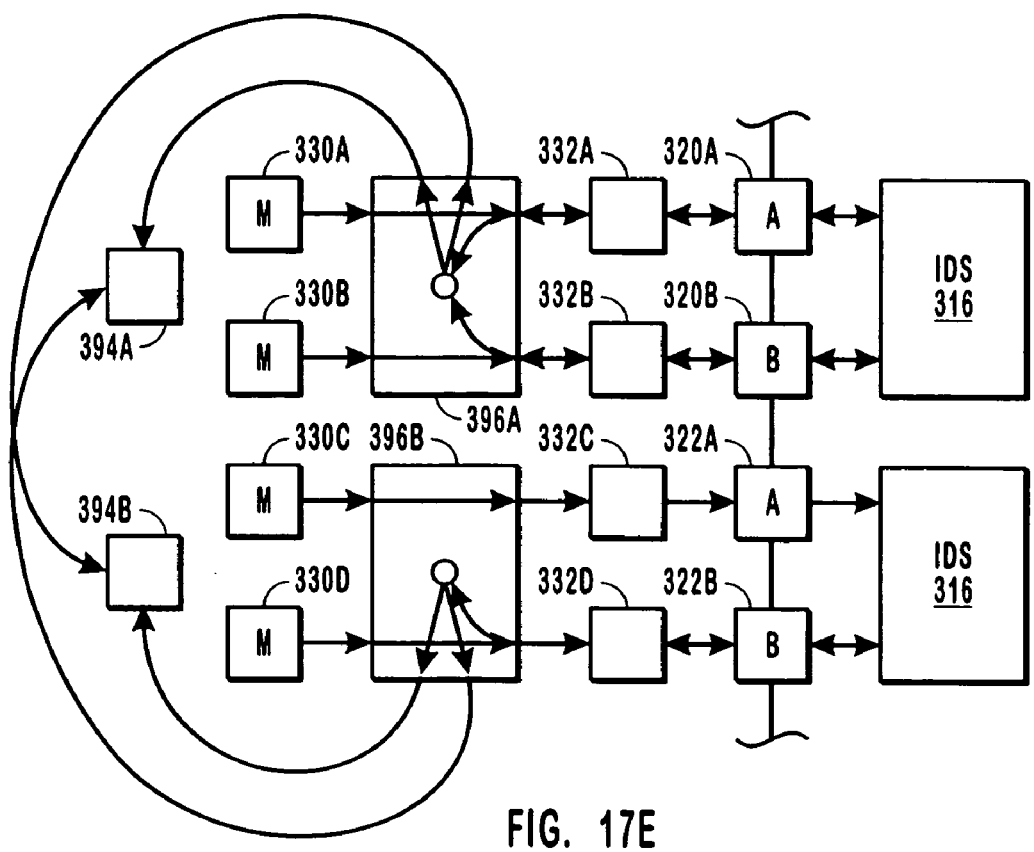
Figure 17F:
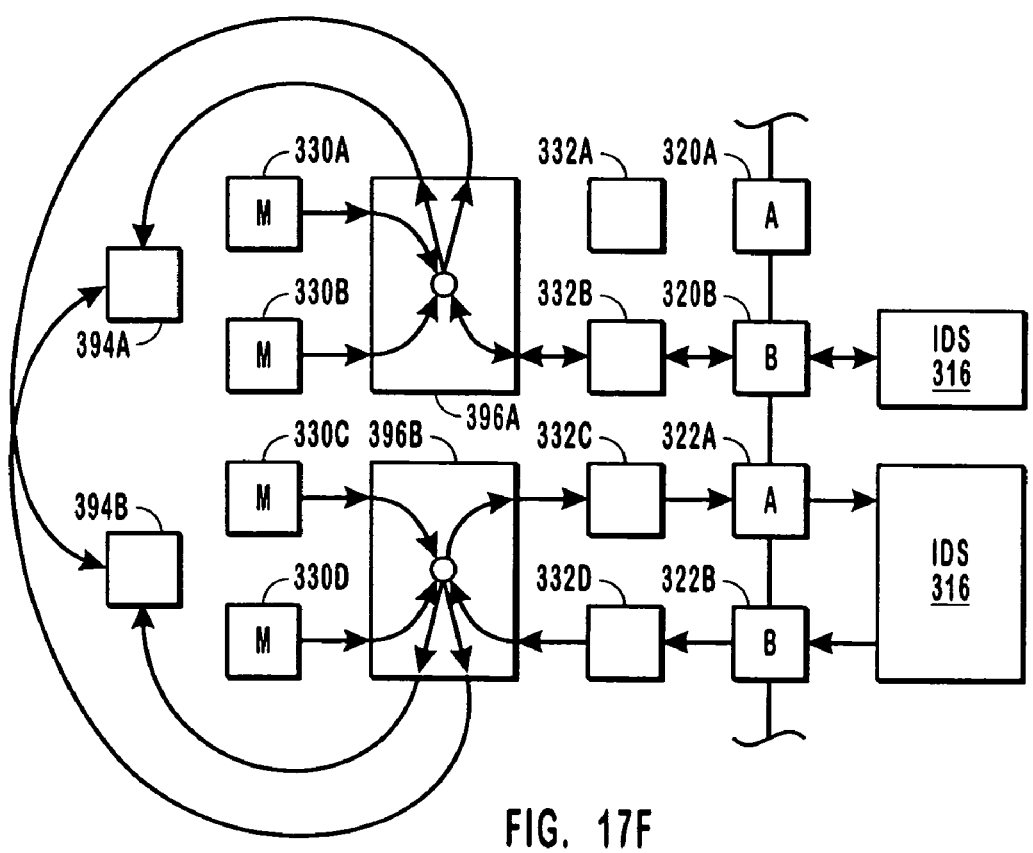
Figure 17G:
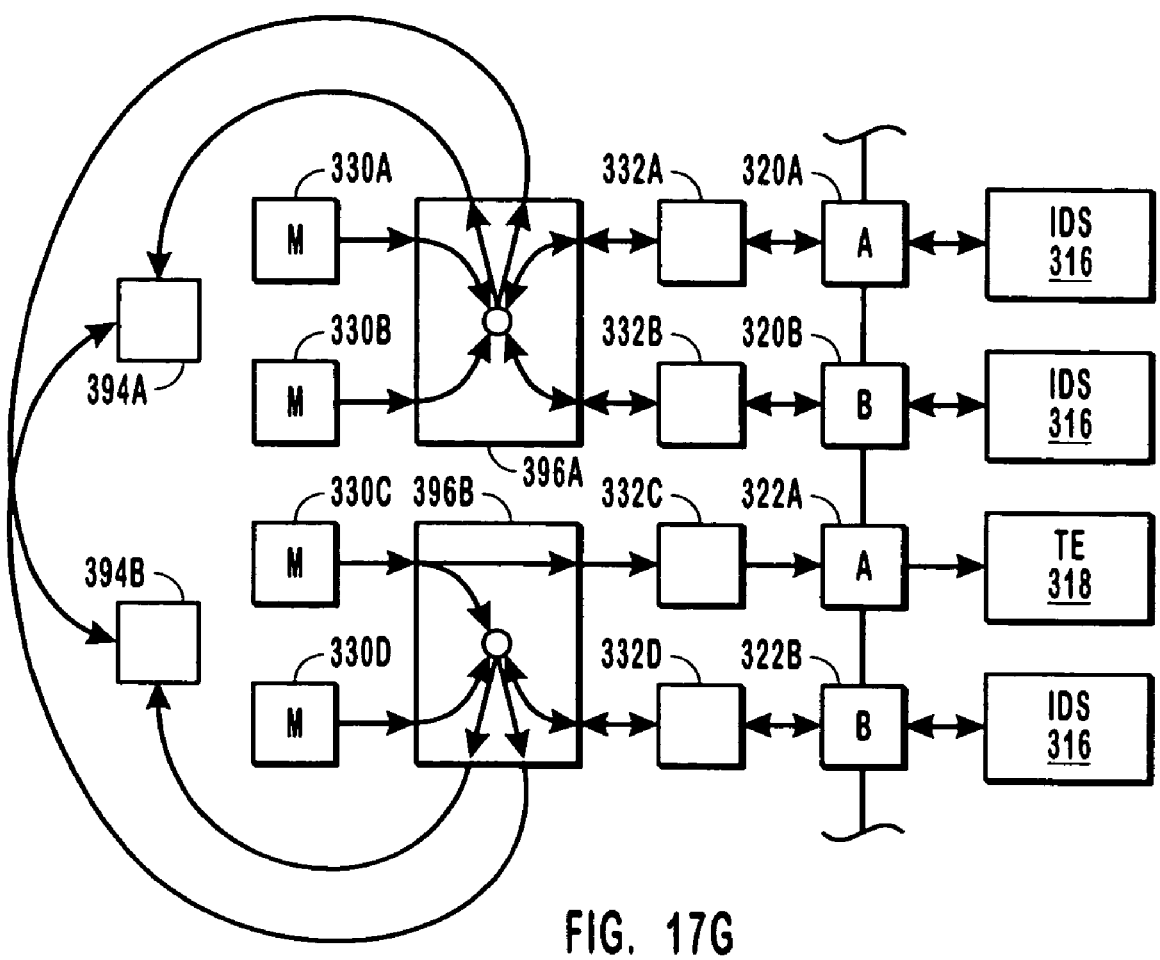

The fifth mode is a "return path" mode, illustrated in FIGS. 17E through 17G. In the "return path" mode, ports 320, 322 are enabled to transmit device data. That is, ports 320, 322 can operate in a bi-directional mode such that device data (e.g., kill packets) can be sent from intrusion detection system 316 and/or testing equipment 318. The bidirectional arrows in FIGS. 17E through 17G indicate that ports 320A, 320B and ports 322A, 322B can be configured for bidirectional data flow.

FIG. 17E illustrates the embodiment of FIG. 17A having a return path functionality. FIG. 17E illustrates two different ways of incorporating a return path with the pass through function. With regard to ports 320A, 320B, an intrusion detection system 316 is connected to both ports. Switch 396A allows network data from multiplexers 330A, 330B to pass through to ports 320A, 320B. Intrusion detection system 316 sends return device data through port 320A and 320B which is sent to switch 396A. At switch 396A, the device data is combined and mirrored. The combined and mirrored device data is transmitted to fan out buffers 394A, 394B to be delivered to communication cables 302.

With regard to ports 322A, 322B, an intrusion detection system 316 is connected to both ports. Network data is passed through switch 396B to ports 322A, 322B. Return device data is transmitted through port 322B and delivered to switch 396B. The return device data is duplicated and transmitted to fan out buffers 394A, 394B.

FIG. 17F illustrates the return path mode with the embodiments of FIG. 17B. With regard to ports 320A, 320B, an intrusion detection system 316 is connected only to port 320B. The network data coming from multiplexers 330A, 330B is combined and then sent to port 320B. Intrusion detection system 316 sends device data back through port 320B which is transmitted to switch 396A. At switch 396A, the device data is duplicated and sent to fan out buffers 394A, 394B.

With regard to ports 322A, 322B, an intrusion detection system is connected to both ports. However, combined network data is delivered from switch 396B to only port 322A. Intrusion detection system 316 sends device data back through port 322B. The device data is duplicated at switch 396B and sent to fan out buffers 394A, 394B.

FIG. 17G illustrates the return path function with the embodiment of FIG. 17C and 17D. With regard to ports 320A, 320B, a separate intrusion detection system 316 is connected to each port. Network data is transmitted from multiplexers 330A, 330B and combined and mirrored in switch 396A. A copy of the data is transmitted to each of port 320A, 320B so that each intrusion detection system 316 receives all of the data being transmitted by a particular communication cable 302. Each intrusion detection system 316 is allowed to transmit device data back through port 320A or 320B. The device data is transmitted to switch 396A which duplicates the device data and delivers it to fan out buffers 394A, 394B.

With regard to ports 322A, 322B, testing equipment 318 is connected to port 322A and an intrusion detection system 316 is connected to port 322B. Network data arrives at switch 396B. Switch 396B allows data from multiplexer 330C to pass through to port 322A. In addition, switch 396B combines and mirrors the network data and sends it to port 322B. Intrusion detection system 316 transmits device data back through port 322B which is delivered to switch 396B. Switch 396B duplicates the device data and delivers it to fan out buffers 394A, 394B.

It will be appreciated that testing equipment 318 and intrusion detection system 316 are interchangeable. That is, intrusion detection system 316 may be connected to either ports 320A, 320B or ports 322A, 322B. Similarly, testing equipment 318 may be connected to either ports 320A, 320B or ports 322A, 322B. Thus, it is also contemplated that testing equipment 318 is able to transmit device data into network tap 600 or 700 through ports 320 and/or 322. It will be noted that testing equipment 318 or intrusion detection system 316 may also send information to client device 348 since switches 396A, 396B can be connected to integrated circuitry 346 as illustrated in FIG. 13.

As discussed above, each configuration of ports may be interchangeably used for either testing equipment 318 or intrusion detection system 316. Thus, it will be appreciated that different combinations of testing equipment 318 and intrusion detection systems 312 may be connected to network tap 600 or 700 at any one time, depending on the user's preferences. In addition, it is not required to use both sets of ports at the same time.

In view of the foregoing, network tap 600 or 700 may operate in a number of different modes controlled by the operation of integrated circuitry 346. These modes provide various different port configurations which may be used to connect different types of attached devices. This may be advantageous where different manufacturers of testing equipment or intrusion detection systems may implement different connections such that network tap 600 or 700 may be used on virtually any network system.

The particular modes may be enabled or disabled as desired by the user. As used herein, the term "enabled" is used to refer to the situation in which a particular functionality of the switches 396A, 396B is operational. Enabling modes may be facilitated by a software program located on client device 348. Preferably, a password or another type of appropriate management security is required to operate the software to prevent unauthorized access to the network. Alternatively, software may be loaded into integrated circuitry 346 through client device 348. In still another embodiment, a user may be able to manually switch modes through controls or buttons 352 on the front panel of network tap 600 or 700.

An additional benefit of using integrated circuitry to enable or disable modes is that the operation of the network tap can be digitally controlled in a robust and programmable way. This permits the network tap to perform any of a variety of operations that have not been possible in conventional network taps that do not include integrated circuitry, an FPGA or a similar digital controller. Some of these functions include the network analysis and statistics gathering operations described above.

Different types of signaling formats may be used in the network taps of the present invention. In one embodiment, signals between ports 308, 310 and physical layer devices 342 may be transmitted in Media Dependent Interface (MDI) format. Signals between one physical layer devices to another physical layer device may be transmitted in Serial Gigabit Media Independent Interface (SGMII) format which consist of serial 1.25 GHz encoding. The exception to this may be signals between integrated circuitry 346 and switches 396A, 396B which may use a PCI bus, SPI communication or I$^2$C serial communication format. Communication between CPU module 362 and FPGA 364 may use a PCI bus. Links between FPGA 364 and PIC 377 may use SPI communication. Those skilled in the art will recognize that other configurations may be used depending on design considerations.

Integrated circuit 346 thus provides a number of functions in the network taps of the present invention.

1. The integrated circuit controls components of the network tap to enable signals to be sent to attached devices.

2. The integrated circuit is able to monitor across all communication cables simultaneously.

3. Integrated circuit can extract statistics from one or more communication cables.

4. Integrated circuit may control the transmission of data on a particular communication cable based on decisions made from the statistics.

5. The integrated circuit controls the function of various components in the network tap (e.g., physical layer devices, multiplexers, relays, switches, buttons, status LEDs, SFPs, UARTs).

6. The integrated circuit allows data from an intrusion detection system or other attached device to be sent to the Internet or LAN without disrupting data flow through the network tap.

7. Integrated circuit can monitor the return device data and deliver it to a remote client device.

8. Integrated circuit can manipulate the multiplexers and switches to provide different port configurations to allow different types of attached devices to be connected to the network tap.

9. Integrated circuit is programmable such that it can be upgraded or programmed with additional functionality.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A network tap configured to communicate with network data carried on a plurality of network cables, comprising:
    a plurality of port sets configured to selectively connect a plurality of network cables to the network tap, each of the plurality of port sets comprising:
        a first port that can receive an end of a first segment of a network cable, and
        a second port that can receive an end of a second segment of a network cable such that when the first segment and the second segment of a network cable are received, network data is permitted to be communicated between the first segment and the second segment;
    a plurality of couplers, each coupler being connected to each of the first ports and the second ports, wherein each coupler is configured to receive a network data signal and generate a plurality of duplicate network data signals; and
    an integrated circuitry in communication with a duplicate network data signal from each coupler.

2. The network tap as recited in claim 1, further comprising a control port in communication with the integrated circuitry, the control port configured to be selectively connected to a remote client.

3. The network tap as recited in claim 1, wherein the integrated circuitry is configured to extract statistics from each of the network data signals from each coupler.

4. The network tap as recited in claim 1, further comprising at least one tap port through which a copy of the network data of one network cable can be transmitted to an attached device.

5. The network tap as recited in claim 4, wherein the at least one tap port is configured to receive device data from the attached device and to communicate the received device data through at least one of the first port and the second port of at least one of the plurality of port sets.

6. The network tap as recited in claim 4, further comprising a first level of multiplexers disposed in communication with the plurality of port sets and the at least one tap port, the first level of multiplexers comprising:
    a first series of multiplexers connected to the couplers corresponding to the first ports; and
    a second series of multiplexers connected to the couplers corresponding to the second ports.

7. The network tap as recited in claim 4, further comprising a switch disposed in communication between the plurality of port sets and the at least one tap port.

8. The network tap as recited in claim 7, wherein the switch is in communication with the integrated circuitry.

9. The network tap as recited in claim 7, further comprising a fan out buffer disposed in communication between the plurality of port sets and the switch.

10. The network tap as recited in claim 1, wherein the integrated circuitry comprises a Field Programmable Gate Array.

11. The network tap as recited in claim 1, wherein the network tap is configured to be connected in series to a second network tap, the network tap further comprising at least one cascading network port configured to be selectively connected to the at least one tap port of the second network tap.

12. The network tap as recited in claim 11, further comprising at least one cascade control port in communication with the integrated circuitry, the at least one cascade control port configured to communicate with a cascade control port of the second network tap.

13. A network tap that permits an attached device to communicate with network data carried on a plurality of network cables, comprising:
    a plurality of port sets configured to selectively connect a plurality of network cables to the network tap, each of the plurality of port sets comprising:
        a first port configured to transmit a network data signal, the first port configured to receive an end of a first segment of a network cable,
        a second port configured to transmit a network data signal, the second port configured to receive an end of a second segment of a network cable such that when the first segment and the second segment of a network cable are received, network data is permitted to be communicated between the first segment and the second segment; and
    at least one tap port through which a copy of the network data of one network cable can be transmitted to an attached device, the at least one tap port being configured to receive device data from the attached device and to communicate the received device data through at least one of the first port and the second port of at least one of the plurality of port sets.

14. The network tap as recited in claim 13, wherein one of the first port and the second port is adapted to communicate with a firewall of a network and wherein the device data includes a kill packet for controlling the operation of the firewall.

15. The network tap as recited in claim 13, wherein the attached device is an intrusion detection system.

16. The network tap as recited in claim 13, wherein a switch is disposed between the plurality of port sets and the at least one tap port to act as a routing node for transmission of network data and device data between the network tap and the attached device.

17. The network tap as recited in claim 16, wherein the switch is configured to combine a network data signal from the first port and the second port of one of the plurality of port sets forming a combined network data signal and transmit the combined network data signal to the at least one tap port.

18. The network tap as recited in claim 17, wherein the switch is configured to mirror the combined network data signal, forming a mirrored network data signal, and transmit the mirrored network data signal to the at least one tap port.

19. The network tap as recited in claim 16, wherein the switch is configured to receive device data from an attached device connected to the at least one tap port and transmit the device data to at least one of the first port and second port of at least one of the plurality of port sets.

20. The network tap as recited in claim 16, further comprising at least one fan out buffer disposed between the switch and the plurality of port sets, wherein the switch directs the device data to the fan out buffer to be transmitted by the fan out buffer to at least one of the first port and second port of at least one of the plurality of port sets.

21. The network tap as recited in claim 13, further comprising an integrated circuitry.

22. The network tap as recited in claim 21, wherein the at least one tap port is in communication with the integrated circuitry so that the integrated circuitry receives a copy of the device data.

23. A network tap that permits an attached device to communicate with network data carried on a plurality of network cables, comprising:
   a plurality of port sets configured to selectively connect a plurality of network cables to the network tap, each of the plurality of port sets comprising:
      a first port that can receive an end of a first segment of a network cable, and
      a second port that can receive an end of a second segment of a network cable such that when the first segment and the second segment of a network cable are received, network data is permitted to be communicated between the first segment and the second segment;
   a plurality of couplers, each coupler being connected to each of the first ports and the second ports, wherein each coupler is configured to receive a network data signal and generate a plurality of duplicate network data signals;
   a first level of multiplexers connected to the plurality of couplers comprising:
      a first series of multiplexers connected to the couplers corresponding to the first ports, and
      a second series of multiplexers connected to the couplers corresponding to the second ports;
   at least one tap port through which a network data signal from at least one of the first series of multiplexers and the second series of multiplexers can be transmitted to an attached device; and
   an integrated circuitry disposed in communication with the first level of multiplexers for controlling which of the network data signals from the first and second series of multiplexers is sent to the at least one tap port.

24. The network tap as recited in claim 23, further comprising a second level of multiplexers comprising:
   a first series of multiplexers connected to the first series of multiplexers of the first level of multiplexers; and
   a second series of multiplexers connected to the second series of multiplexers of the first level of multiplexers.

25. The network tap as recited in claim 24, further comprising a third level of multiplexers comprising:
   a first series of multiplexers connected to the first series of multiplexers of the second level of multiplexers; and
   a second series of multiplexers connected to the second series of the multiplexers of the second level of multiplexers.

26. The network tap as recited in claim 23, further comprising a control port in communication with the integrated circuitry, the control port being configured to be selectively connected to a remote client.

27. The network tap as recited in claim 23, wherein the integrated circuitry comprises a Field Programmable Gate Array.

28. The network tap as recited in claim 27, wherein the Field Programmable Gate Array comprises:
   a physical layer device;
   a buffer; and
   a packet analysis module.

29. The network tap as recited in claim 28, wherein the Field Programmable Gate Array further comprises:
   a memory; and
   a control logic.

30. The network tap as recited in claim 29, wherein the Field Programmable Gate Array further comprises a buffer configured to communicate with a remote client.

31. The network tap as recited in claim 23, wherein a switch is disposed between the first level of multiplexers and the at least one tap port.

32. The network tap as recited in claim 31, wherein the switch is configured to receive device data from an attached device connected to the at least one tap port and transmit the device data to at least one of the first port and second port of at least one of the plurality of port sets.

33. The network tap as recited in claim 32, further comprising at least one fan out buffer disposed between the switch and the plurality of couplers, wherein the switch directs the device data to the fan out buffer to be transmitted by the fan out buffer to at least one of the plurality of couplers.

34. The network tap as recited in claim 31, wherein the switch is configured to combine a duplicate network data signal from the first series of multiplexers of the first level of multiplexers and a duplicate network data signal from the second series of multiplexers of the first level of multiplexers forming a combined network data signal and transmit the combined network data signal to the at least one tap port.

35. The network tap as recited in claim 34, wherein the switch is configured to mirror the combined network data signal, forming a mirrored network data signal, and transmit the mirrored network data signal to the at least one tap port, the at least one tap port comprising a first tap port and a second tap port.

36. A system of network taps configured to operate in a cascading configuration, each of the network taps being configured to communicate with network data carried on a plurality of network cables, comprising:
   a first and second network tap configured to connect in series, each network tap comprising:
      a plurality of port sets configured to selectively connect a plurality of network cables to the network tap, each of the plurality of port sets comprising:
         a first port that can receive an end of a first segment of a network cable;
         a second port that can receive an end of a second segment of a network cable such that when the first segment and the second segment of a network cable are received, network data is permitted to be communicated between the first segment and the second segment;

at least one tap port through which a copy of the network data of one network cable can be transmitted to an attached device;

at least one cascading network port configured to be selectively connected to the at least one tap port of another network tap and to transmit network data of the other network tap to the at least one tap port; and means for controlling which network data signal is delivered to the at least one tap port.

37. The system as recited in claim 36, wherein the means for controlling which network data signal is delivered to the at least one tap port comprises:

a first level of multiplexers comprising:
 a first series of multiplexers connected to the couplers corresponding to the first ports, and
 a second series of multiplexers connected to the couplers corresponding to the second ports;
an integrated circuitry in communication with the first level of multiplexers; and
at least one cascade control port in communication with the integrated circuitry, the at least one cascade control port configured to communicate with the at least one cascade control port of another network tap.

38. The system as recited in claim 36, wherein each network tap further comprises a control port configured to be selectively connected to a remote client.

39. The system as recited in claim 37, further comprising a second level of multiplexers comprising:

a first series of multiplexers connected to the first series of multiplexers of the first level of multiplexers; and
a second series of multiplexers connected to the second series of multiplexers of the first level of multiplexers.

40. The network tap as recited in claim 39, further comprising a third level of multiplexers comprising:

a first series of multiplexers connected to the first series of multiplexers of the second level of multiplexers; and
a second series of multiplexers connected to the second series of the multiplexers of the second level of multiplexers.

41. The network tap as recited in claim 40, wherein the third level of multiplexers is connected to the at least one cascading network port.

42. The network tap as recited in claim 41, further comprising a coupler connected to each of the first series and second series of multiplexers in the third level of multiplexers.

43. The network tap as recited in claim 42, wherein the coupler comprises:

a physical layer device; and
a transformer.

44. The network tap as recited in claim 36, further comprising a switch disposed in communication between the plurality of port sets and the at least one tap port.

* * * * *

UNITED STATES PATENT AND TRADEMARK OFFICE
CERTIFICATE OF CORRECTION

| | | |
|---|---|---|
| PATENT NO. | : 7,308,705 B2 | Page 1 of 4 |
| APPLICATION NO. | : 10/742172 | |
| DATED | : December 11, 2007 | |
| INVENTOR(S) | : Gordy et al. | |

It is certified that error appears in the above-identified patent and that said Letters Patent is hereby corrected as shown below:

Drawings
Replace FIG. 4A with the figure depicted below, wherein the A segment 304A, B segment 306A, LAN 314, and Internet 312 have been added.

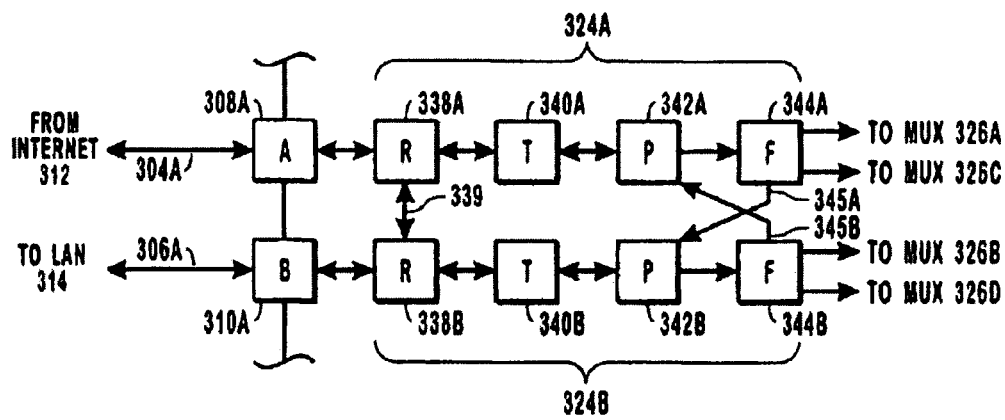

FIG. 4A

Signed and Sealed this
Twenty-eighth Day of August, 2012

David J. Kappos
*Director of the United States Patent and Trademark Office*

CERTIFICATE OF CORRECTION (continued)

U.S. Pat. No. 7,308,705 B2

Replace FIG. 6B with the figure depicted below, wherein the multiplexer 326A has been labeled.

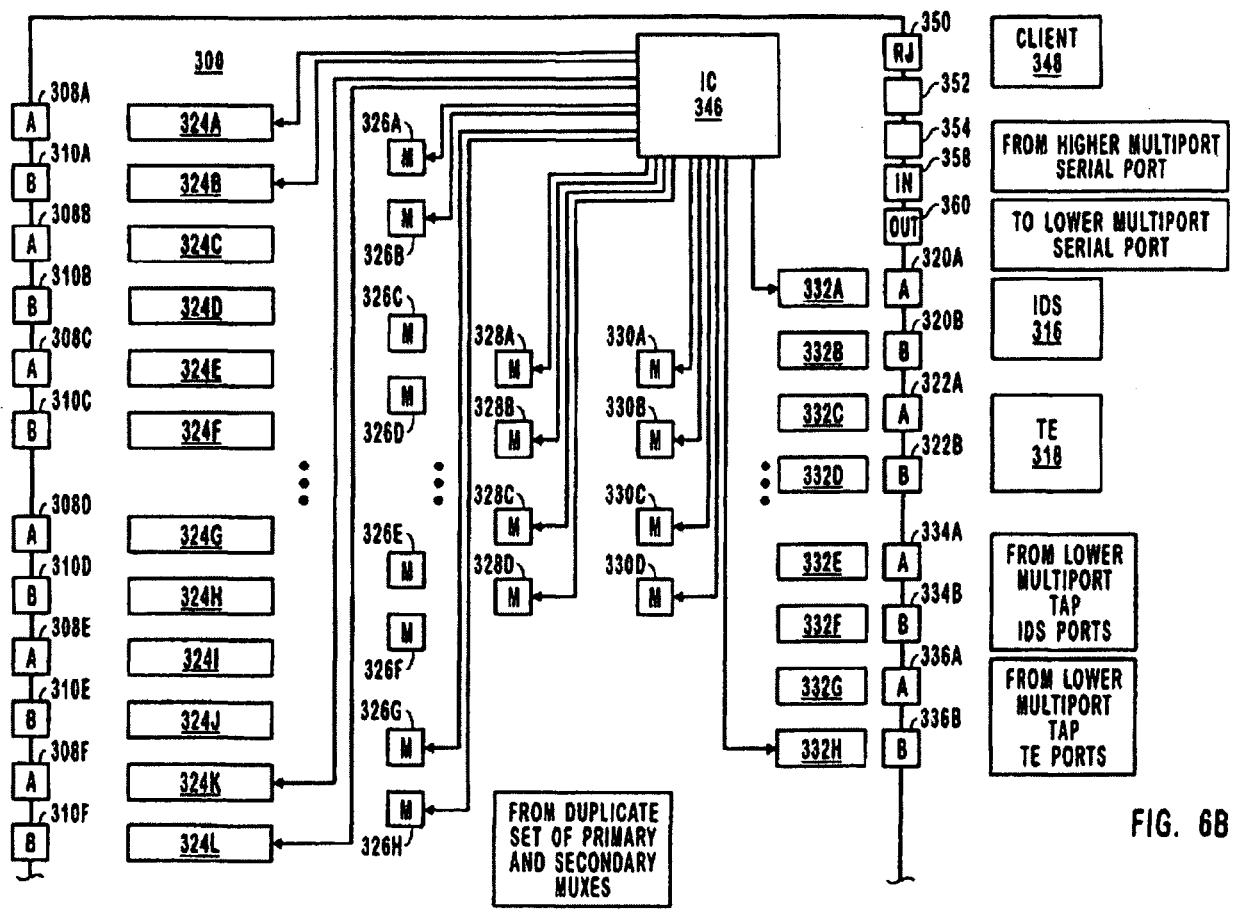

FIG. 6B

Replace FIG. 14A with the figure depicted below, wherein the A segment 304A, B segment 306A, LAN 314, and Internet 312 have been added.

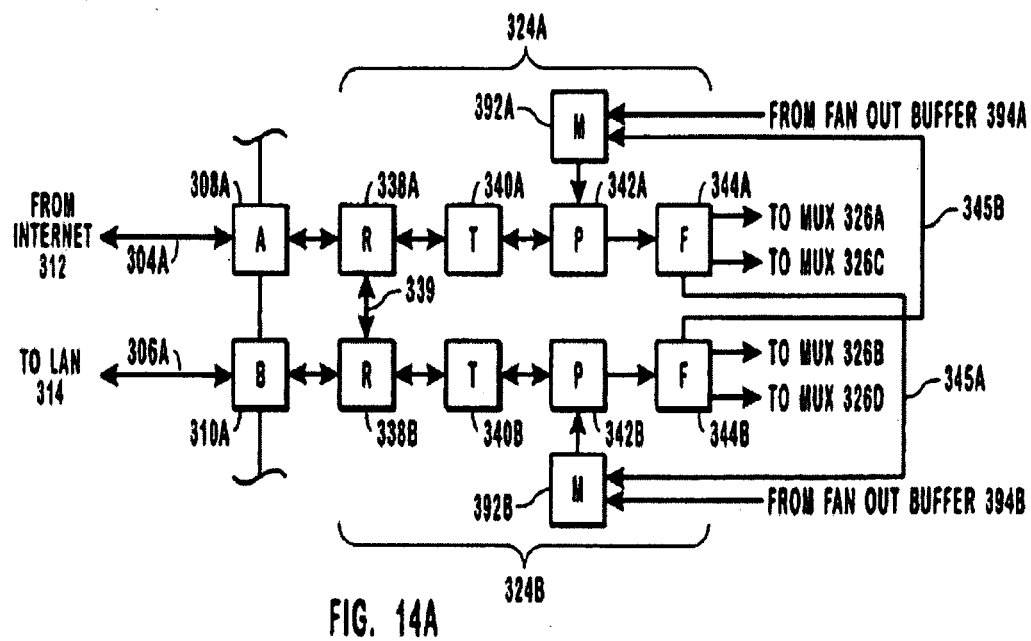

FIG. 14A

CERTIFICATE OF CORRECTION (continued)
U.S. Pat. No. 7,308,705 B2

Replace FIG. 16 with the figure depicted below, wherein buffer 768A is relabeled as buffer 386A.

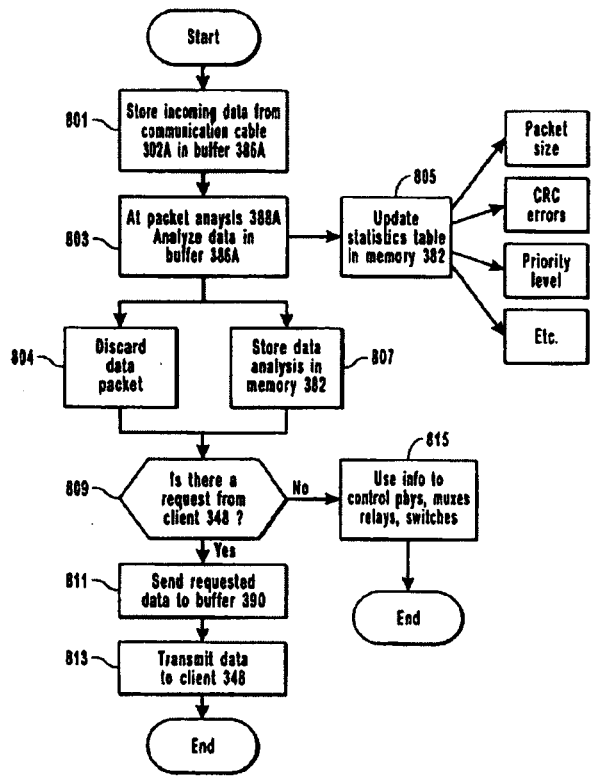

FIG. 16

Column 9
Line 44, after the description for FIG. 4B, add the following description:
[FIG. 5A through 5C illustrate block diagrams of embodiments of the integrated circuitry of FIG. 3]

Column 12
Line 9, change "31OF" to --310F--

Column 13
Line 26, after "referred to as" remove [an]
Line 47, change "3241" to --324I--

Column 15
Line 40, change "330B" to --338B--
Line 51, change "buffers" to --buffer--

Column 16
Line 4, after "LAN" add [314]
Line 8, after "Internet" add [312]
Line 44, change "tertiary A" to --tertiary B--

Column 17
Line 27, change "(not shown)" to --348--
Line 24, change "348" to --348 (see FIG. 3)--

Column 18
Line 27, after "FPGA" add [364]

Column 19
Line 6, after "network tap" add [300]
Line 23, after "control logic" add [380]

Column 20
Line 12, change "signal" to --signals--
Line 15, change "is" to --are--

Column 21
Line 17, change "network tap B" to --network tap 300B--

Column 23
Line 59, change "300" to --500--
Line 62, change "300" to --500--

Column 24
Line 9, change "300" to --500--
Line 10, after "CPU module" add [362]
Line 11, after "communication cable" add [302]
Line 13, after "communication cable" add [302]

Column 26
Line 22, after "Internet" add [312]
Line 26, after "LAN" add [314]

Column 28
Line 18, change "300" to --800--
Line 42, change "302L" to --302F--
Line 45, change "302" to --302A--

Column 29
Line 28, change "350" to --348--

Column 32
Line 9, change "312" to --316--
Line 48, change "layer devices" to --layer device--